United States Patent
Chiba et al.

(10) Patent No.: US 11,922,964 B2
(45) Date of Patent: Mar. 5, 2024

(54) PSD OPTIMIZATION APPARATUS, PSD OPTIMIZATION METHOD, AND PROGRAM

(71) Applicant: NIPPON TELEGRAPH AND TELEPHONE CORPORATION, Tokyo (JP)

(72) Inventors: Hironobu Chiba, Tokyo (JP); Kenta Niwa, Tokyo (JP); Noboru Harada, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 205 days.

(21) Appl. No.: 17/633,191

(22) PCT Filed: Aug. 8, 2019

(86) PCT No.: PCT/JP2019/031449
§ 371 (c)(1),
(2) Date: Feb. 5, 2022

(87) PCT Pub. No.: WO2021/024474
PCT Pub. Date: Feb. 11, 2021

(65) Prior Publication Data
US 2022/0343932 A1 Oct. 27, 2022

(51) Int. Cl.
*G10L 21/0232* (2013.01)
*G06F 17/11* (2006.01)
(Continued)

(52) U.S. Cl.
CPC .......... *G10L 21/0232* (2013.01); *G06F 17/11* (2013.01); *G10L 2021/02166* (2013.01); *H04R 3/04* (2013.01)

(58) Field of Classification Search
CPC . H04R 3/04; H04R 3/005; H04R 5/04; H04R 1/406; H04R 2430/03;
(Continued)

(56) References Cited

U.S. PATENT DOCUMENTS 8,712,951 B2 * 4/2014 Loewenstein .......... G01R 29/26
706/52
10,219,083 B2 * 2/2019 Farmani ............... H04R 25/552
(Continued)

OTHER PUBLICATIONS

Niwa et al. (2014) "Post-filter design for speech enhancement in various noisy environments" 2014 14th International Workshop on Acoustic Signal Enhancement(IWAENC), IEEE, Sep. 8, 2014.

*Primary Examiner* — Xu Mei

(57) ABSTRACT

Sound source enhancement technology is provided that is capable of improving sound source enhancement capabilities in accordance with settings of usage and applications. A PSD optimization device includes a PSD updating unit that takes a target sound PSD input value $\hat{\varphi}S(\omega, \tau)$, an interference noise PSD input value $\hat{\varphi}IN(\omega, \tau)$, and a background noise PSD input value $\hat{\varphi}BN(\omega, \tau)$ as input, and generates a target sound PSD output value $\varphi S(\omega, \tau)$, an interference noise PSD output value $\hat{\varphi}IN(\omega, \tau)$, and a background noise PSD output value $\hat{\varphi}BN(\omega, \tau)$, by solving an optimization problem for a cost function relating to a variable uS representing a target sound PSD, a variable uIN representing an interference noise PSD, and a variable uBN representing a background noise PSD. The optimization problem for the cost function is defined using at least one of a constraint relating to a frequency structure of a sound source or a convex cost term relating to the frequency structure of the sound source, a constraint relating to a temporal structure of the sound source or a convex cost term relating to the temporal structure of the sound source, and a constraint
(Continued)

relating to a spatial structure of the sound source or a convex cost term relating to the spatial structure of the sound source.

17 Claims, 10 Drawing Sheets

(51) Int. Cl.
*G10L 21/0216* (2013.01)
*H04R 3/04* (2006.01)

(58) Field of Classification Search
CPC ....... H04R 2430/25; H04R 1/40; G06F 17/11; G06N 5/01; G10L 21/0232; G10L 2021/02166
USPC .............. 381/98, 94.1–94.9, 56, 91, 92, 122
See application file for complete search history.

(56) References Cited

U.S. PATENT DOCUMENTS

| | | | | |
|---|---|---|---|---|
| 2012/0093333 A1* | 4/2012 | Hu | .......................... | H04R 1/406 |
| | | | | 381/71.7 |
| 2012/0093344 A1* | 4/2012 | Sun | ........................ | H04R 3/005 |
| | | | | 367/138 |
| 2012/0224456 A1* | 9/2012 | Visser | ...................... | G01S 7/521 |
| | | | | 367/118 |
| 2012/0243695 A1* | 9/2012 | Sohn | .................... | H04R 25/407 |
| | | | | 381/56 |

* cited by examiner

[Fig. 1]
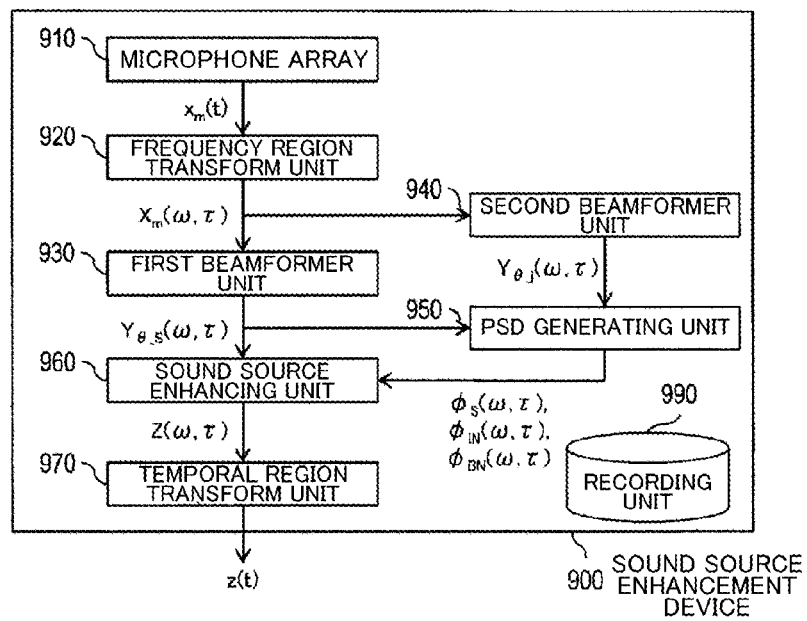

[Fig. 2]
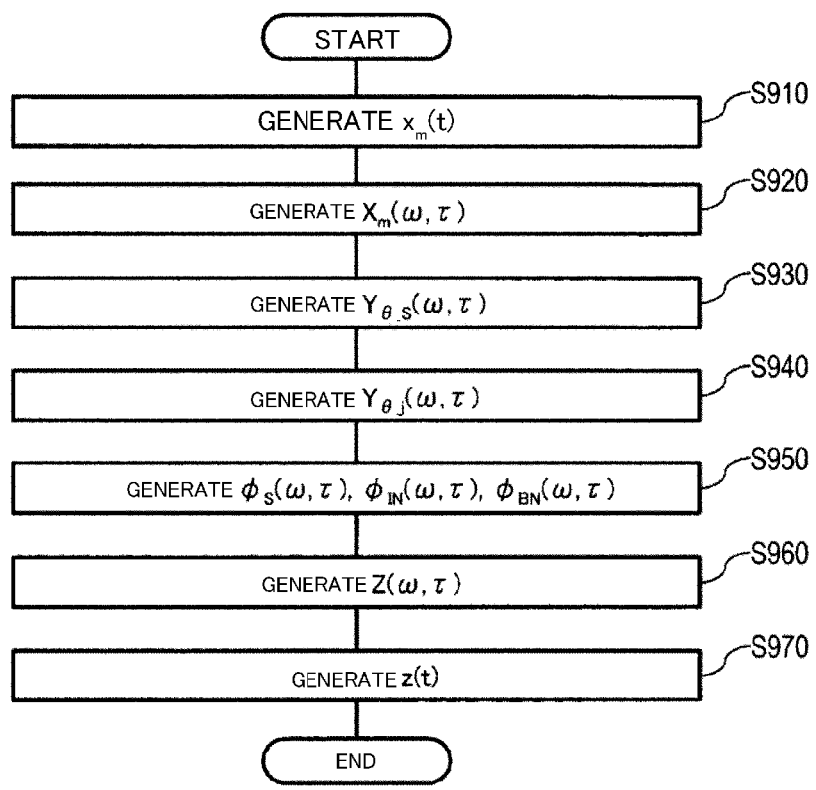

[Fig. 3]
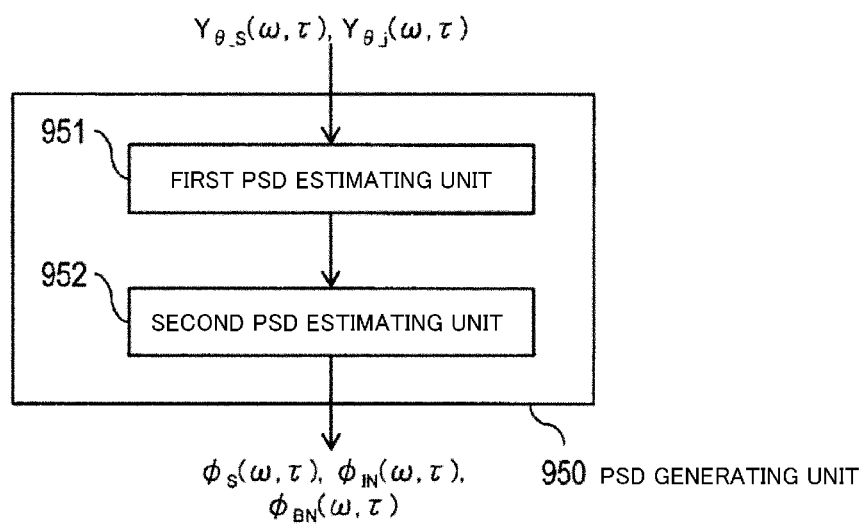
[Fig. 4]
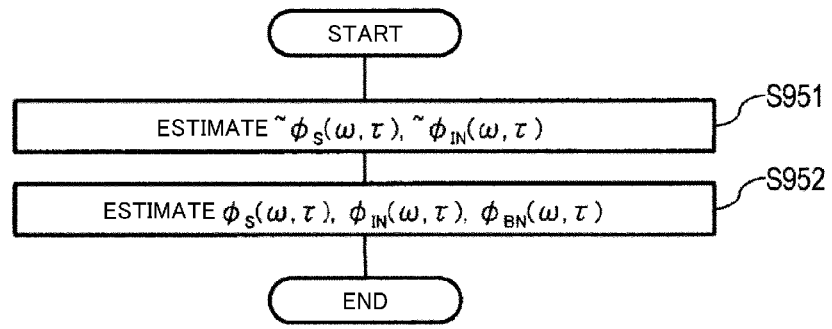

[Fig. 5]

Algorithm 1 B-P-R splitting based PSD estimation algorithm

Initialization of $\tilde{p}^0, \tilde{q}^0, \tilde{r}^0$ for each frequency band
   for $t = 0, \ldots, T - 1$ do
      $u^{t+1} = \arg\min_u \Big( F_1(u) + J_{D_p^*}(Au \| \tilde{p}^t)$
                               $+ J_{D_q^*}(Bu \| \tilde{q}^t - c) + J_{D_r^*}(u \| -\tilde{r}^t) \Big)$
      $\tilde{p}^{t+1/2} = \tilde{p}^t - 2Au^{t+1}$
      $\tilde{q}^{t+1} = \tilde{q}^t - 2(Bu^{t+1} - c)$
      $\tilde{r}^{t+1/2} = \tilde{r}^t - 2u^{t+1}$
      $v^{t+1} = \arg\min_v \Big( F_2(v) + J_{D_p^*}(v \| -\tilde{p}^{t+1/2}) \Big)$
      $\tilde{p}^{t+1} = \tilde{p}^{t+1/2} + 2v^{t+1}$
      for $i = 1, \ldots, 3$ do
         $\tilde{r}_i^{t+1} = \begin{cases} \tilde{r}_i^{t+1/2} & (\text{if } \tilde{r}_i^{t+1/2} \geq 0) \\ -\tilde{r}_i^{t+1/2} & (\text{otherwise}) \end{cases}$
      end for
   end for

[Fig. 6]
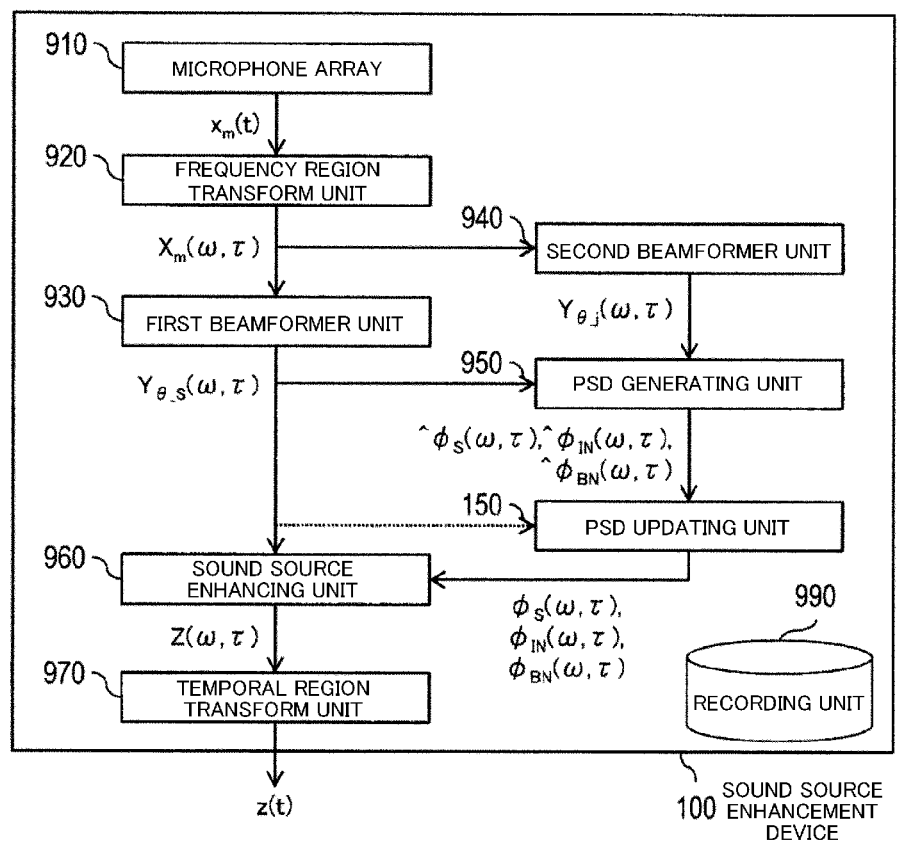

[Fig. 7]
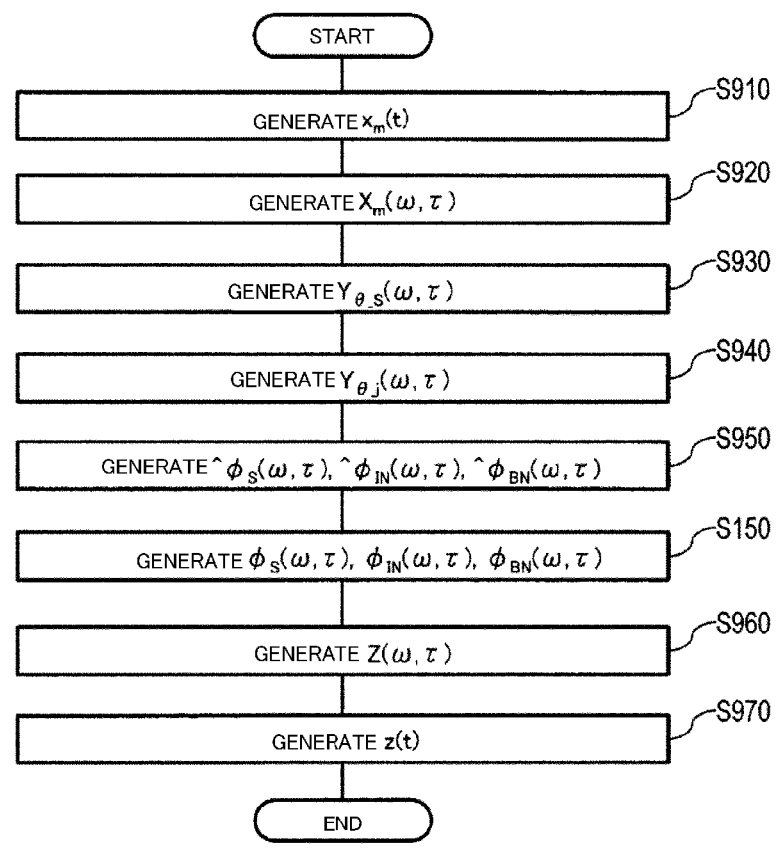

[Fig. 8]
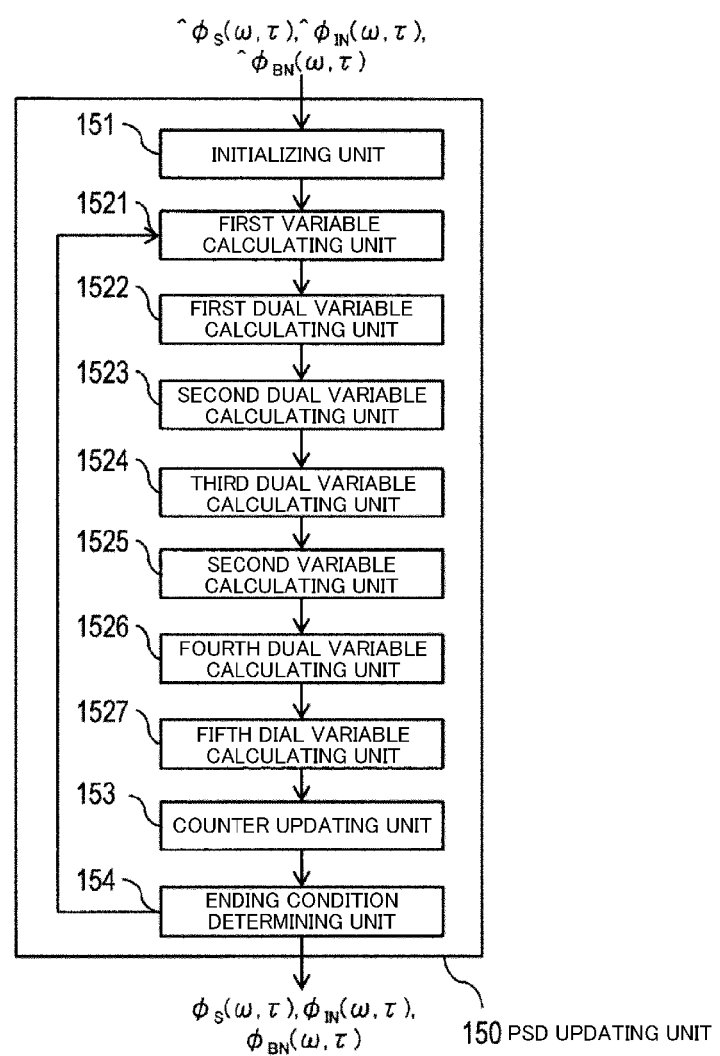

[Fig. 9]
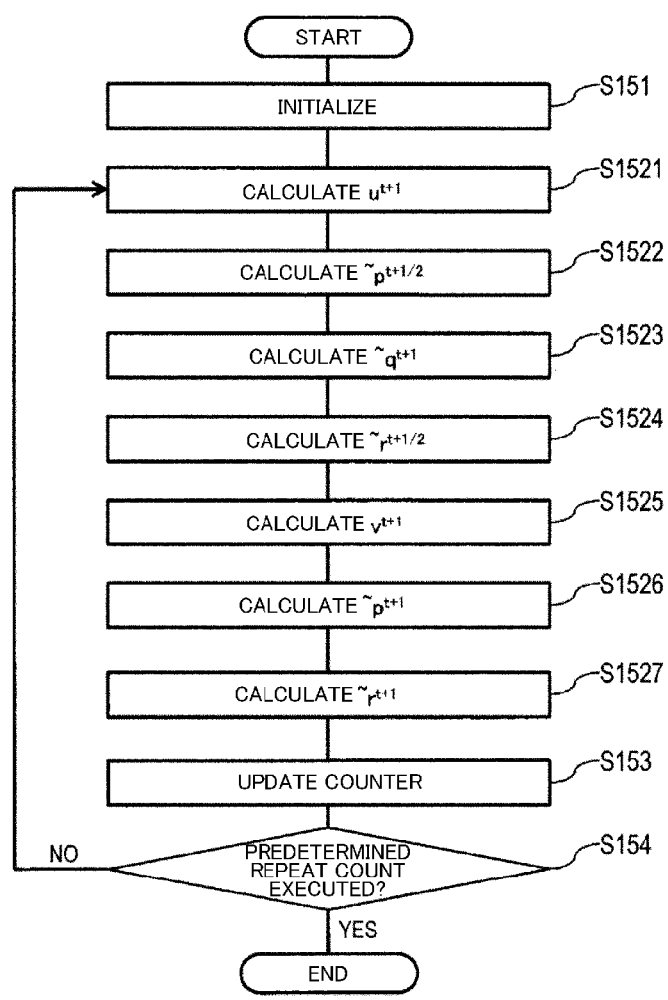

[Fig. 10]
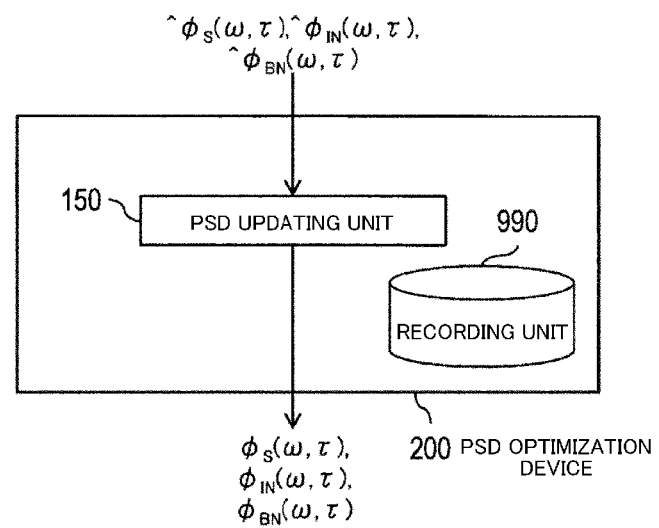

[Fig. 11]
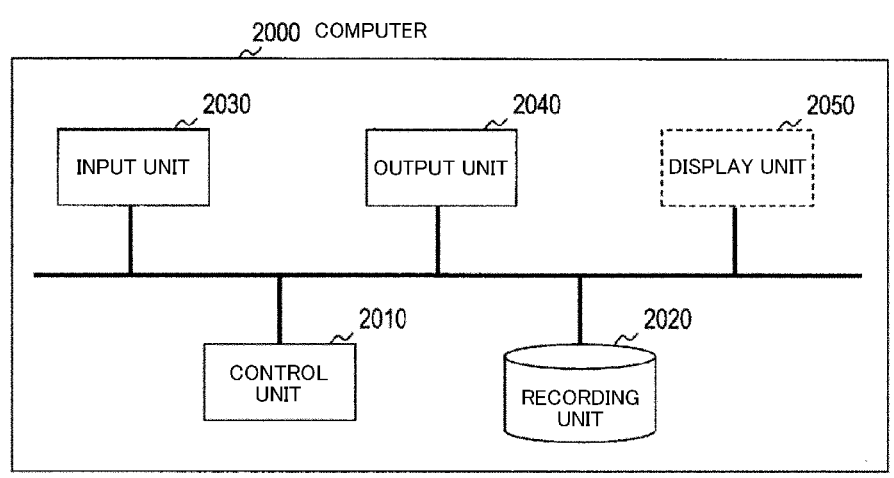

PSD OPTIMIZATION APPARATUS, PSD OPTIMIZATION METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2019/031449, filed on 8 Aug. 2019, the disclosure of which is hereby incorporated herein by reference in its entirety.

TECHNICAL FIELD

The present invention is an invention that relates to sound source enhancement technology for clearly extracting sound of a sound source in a particular direction, using a microphone array.

BACKGROUND ART

NPL 1 discloses a sound source enhancement technique that realizes target sound enhancement in real time. This technique is a low-computation-amount sound source enhancement technique that uses linear filtering by beamforming and nonlinear filtering by a Weiner filter. In this technique, a Weiner filter that enhances a target sound is constructed by estimating power spectral density (PSD: Power Spectral Density) of target sound, interference noise, and background noise, using enhanced signals of a sound source in a target sound direction of arrival and enhanced signals of sound sources in other directions, by a beamformer. Accordingly, the capabilities of the sound source enhancement technique described in NPL 1 are dependent on the PSD estimation precision.

Now, a target sound is a sound that has directionality, and that is emitted by a sound source regarding which enhancement is desired. Also, interference noise is, out of sounds other than the target sound (hereinafter referred to as interfering sound), sounds emitted from a sound source of which the direction of arrival can be identified, such as direct waves, early reflections, and so forth (e.g., speech of a person, who is at a direction other than the direction of arrival of the target sound, speaking). Background noise is sound that is, out of the interfering sound, emitted by a sound source of which the direction of arrival cannot be identified, such as reverberations, device noise, and so forth.

CITATION LIST

Non Patent Literature

[NPL 1] K. Niwa, Y. Hioka, and K. Kobayashi, "Post-filter design for speech enhancement in various noisy environments", 2014 14th International Workshop on Acoustic Signal Enhancement (IWAENC), IEEE, 2014.

SUMMARY OF THE INVENTION

Technical Problem

There are cases in which the quality of the target sound obtained as a result of sound source enhancement is insufficient in the technique according to NPL 1, depending on the noise environment. Specifically, phenomena occur such as components of the target sound that are auditorily important being deleted, interference noise and background noise remain, nonlinear distortion that is auditorily unpleasant occurring, and so forth. These phenomena are each due to insufficient precision of PSD estimation. The reason that estimation precision is insufficient is that the PSD estimation according to NPL 1 is simple low-computation-amount processing based on commonly-established sound source natures, due to envisioning real-time processing, and due to being oriented toward general-use sound source enhancement that does not limit settings of usage or applications.

Accordingly, it is an object of the present invention to provide sound source enhancement technology that is capable of improving sound source enhancement capabilities in accordance with settings of usage and applications.

Means for Solving the Problem

An aspect of the present invention is a PSD optimization device including a PSD updating unit that, with $u_S$ as a variable representing a target sound PSD, $u_{IN}$ as a variable representing an interference noise PSD, and $u_{BN}$ as a variable representing a background noise PSD, takes a target sound PSD input value $\hat{\varphi}_S(\omega, \tau)$, an interference noise PSD input value $\hat{\varphi}_{IN}(\omega, \tau)$, and a background noise PSD input value $\hat{\varphi}_{BN}(\omega, \tau)$ as input, and generates a target sound PSD output value $\varphi_S(\omega, \tau)$, an interference noise PSD output value $\varphi_{IN}(\omega, \tau)$, and a background noise PSD output value $\varphi_{BN}(\omega, \tau)$, by solving an optimization problem for a cost function relating to the variable $u_S$, the variable $u_{IN}$, and the variable $u_{BN}$. The optimization problem for the cost function is defined using at least one of a constraint relating to a frequency structure of a sound source or a convex cost term relating to the frequency structure of the sound source, a constraint relating to a temporal structure of the sound source or a convex cost term relating to the temporal structure of the sound source, and a constraint relating to a spatial structure of the sound source or a convex cost term relating to the spatial structure of the sound source.

Effects of the Invention

According to the present invention, sound source enhancement capabilities can be improved in accordance with settings of usage and applications.

BRIEF DESCRIPTION OF DRAWINGS

FIG. 1 is a block diagram illustrating a configuration of a sound source enhancement device 900.

FIG. 2 is a flowchart showing operations of the sound source enhancement device 900.

FIG. 3 is a block diagram illustrating a configuration of a PSD generating unit 950.

FIG. 4 is a flowchart showing operations of the PSD generating unit 950.

FIG. 5 is a diagram showing an example of an optimization algorithm.

FIG. 6 is a block diagram illustrating a configuration of a sound source enhancement device 100.

FIG. 7 is a flowchart showing operations of the sound source enhancement device 100.

FIG. 8 is a block diagram illustrating a configuration of a PSD updating unit 150.

FIG. 9 is a flowchart showing operations of the PSD updating unit 150.

FIG. 10 is a block diagram illustrating a configuration of a PSD optimization device 200.

FIG. 11 is a diagram illustrating an example of a functional configuration of a computer that realizes devices in an embodiment of the present invention.

DESCRIPTION OF EMBODIMENTS

Embodiments of the present invention will be described in detail below. Note that components that have the same function are denoted by the same signs, and repetitive description will be omitted.

Notation in the present specification will be explained in advance to description of the embodiments.

An _ (underscore) represents a subscript index. For example, $x^{y\_z}$ represents that $y_z$ is a superscript index of x, and $x_{y\_z}$ represents that $y_z$ is a subscript index of x.

Also, the superscript indices "^" and "~" such as ^x or ~x regarding a certain character x should actually be shown directly above the "x", but are written as ^x and ~x due to limitations in notation of description in the specification.

TECHNICAL BACKGROUND

Embodiments of the present invention are to perform optimization processing with regard to a PSD of a target sound, a PSD of interference noise, and a PSD of background noise, estimated by the technique according to NPL 1, so that sound source enhancement capabilities are improved. Accordingly, the technique of NPL 1, which is a conventional technique, will be described first.

<<Conventional Technique>>

A sound source enhancement device 900 will be described below with reference to FIG. 1 and FIG. 2. The sound source enhancement device 900 executes sound source enhancement on the basis of beamforming and PSD estimation. FIG. 1 is a block diagram illustrating a configuration of the sound source enhancement device 900. FIG. 2 is a flowchart showing operations of the sound source enhancement device 900. The sound source enhancement device 900 includes a microphone array 910, a frequency region transform unit 920, a first beamformer unit 930, a second beamformer unit 940, a PSD generating unit 950, a sound source enhancing unit 960, a temporal region transform unit 970, and a recording unit 990, as illustrated in FIG. 1. The recording unit 990 is a component that records information necessary for processing by the sound source enhancement device 900, as appropriate.

Operations of the sound source enhancement device 900 will be described following FIG. 2.

In S910, the microphone array 910, which is made up of M (where M is an integer of 2 or greater) microphone elements, generates and outputs temporal region observation signals $x_m(t)$ (m=0, 1, ..., M−1) collected by microphone element m. Accordingly, m serves as a number indicating by which microphone element the signal has been observed.

In S920, the frequency region transform unit 920 takes the temporal region observation signals $x_m(t)$ (m=0, 1, ..., M−1) generated in S910 as input, and transforms each of temporal region observation signals $x_m(t)$ (m=0, 1, ..., M−1) into frequency region, thereby generating frequency region observation signals $X_m(\omega, \tau)$ (m=0, 1, ..., M−1), which are output. Discrete Fourier transform can be used for transforming into the frequency region, for example.

The frequency region observation signals $X_m(\omega, \tau)$ are modeled below by the following Expression using target sound $s(\omega, \tau) \in C$, a K number (where K is an integer of 1 or greater) of interference noise $v_k(\omega, \tau) \in C$, and background noise $\varepsilon_m(\omega, \tau) \in C$.

$$X_m(\omega, \tau) = h_m^S(\omega)s(\omega, \tau) + \sum_{k=1}^{K} h_{k,m}^{IN}(\omega)v_k(\omega, \tau) + \varepsilon_m(\omega, \tau) \quad [\text{Math. 1}]$$

Here, $\omega$, $\tau$ represent the angular frequency bin and time frame No., respectively. Also, $h_m^S(\omega) \in C$ is a transfer function between the sound source of the target sound and the microphone element m, and $h_{k,m}^{IN}(\omega) \in C$ (k=1, ..., K) is a transfer function between an interference noise source k and each microphone element m.

In this model, a problem can be handed in which the direction of arrival (DOA: Direction of arrival) of the target sound is known, while the information relating to noise, such as the direction of arrival and number of interference noises, the noise level of background noise, and so forth, for example, is unknown.

In S930, the first beamformer unit 930 takes the frequency region observation signals $X_m(\omega, \tau)$ (m=0, 1, ..., M−1) generated in S920 as input, and generates and outputs enhanced signals $Y_{\theta\_S}(\omega, \tau)$ of a sound source at a target sound direction-of-arrival $\theta_S$ (hereinafter referred to as first enhanced signals $Y_{\theta\_S}(\omega, \tau)$) by performing linear filtering of the frequency region observation signals $X_m(\omega, \tau)$ (m=0, 1, ..., M−1). In a case in which the arrival time difference of the target sound direction-of-arrival $\theta_S$ is known, the first enhanced signals $Y_{\theta\_S}$ are calculated from the following Expression, by a beamforming linear filter (i.e., a beamforming linear filter constructed using the arrival time difference of the target sound direction-of-arrival $\theta_S$) $w_{\theta\_S}^H \in C^M$.

$$Y_{\theta_S}(\omega, \tau) = w_{\theta_S}^H(\omega)X(\omega, \tau) \quad [\text{Math. 2}]$$

Here, $\cdot^H$ represents a complex conjugate transpose. Also, $X(\omega, \tau) = [X_0(\omega, \tau), ..., X_{M-1}(\omega, \tau)]^T$ holds.

In S940, the second beamformer unit 940 takes the frequency region observation signals $X_m(\omega, \tau)$ (m=0, 1, ..., M−1) generated in S920 as input, and generates and outputs L−1 (where L−1 is an integer that is K or greater) enhanced signals $Y_{\theta\_j}(\omega, \tau)$ (j=1, ..., L−1) of sound sources of directions $\theta_j$ other than the target sound direction-of-arrival (hereinafter referred to as second enhanced signals $Y_{\theta\_j}(\omega, \tau)$) by linear filtering of the frequency region observation signals $X_m(\omega, \tau)$ (m=0, 1, ..., M−1). The second beamformer unit 940 calculates the second enhanced signals $Y_{\theta\_j}(\omega, \tau)$ by the same method as the first beamformer unit 930. That is to say, the second beamformer unit 940 calculates the second enhanced signals $Y_{\theta\_j}(\omega, \tau)$ by the beamforming linear filter constructed using the arrival time difference of directions $\theta_j$ other than the target sound direction-of-arrival, set in advance.

In S950, the PSD generating unit 950 takes the first enhanced signals $Y_{\theta\_S}(\omega, \tau)$ generated in S930 and the second enhanced signals $Y_{\theta\_j}(\omega, \tau)$ (j=1, ..., L−1) generated in S940 as input, and generates and outputs target sound PSD $\varphi_S(\omega, \tau)$, interference noise PSD $\varphi_{IN}(\omega, \tau)$, and background noise PSD $\varphi_{BN}(\omega, \tau)$, using the first enhanced signals $Y_{\theta\_S}(\omega, \tau)$ and the second enhanced signals $Y_{\theta\_j}(\omega, \tau)$ (j=1, ..., L−1).

The PSD generating unit 950 will be described below with reference to FIG. 3 and FIG. 4. FIG. 3 is a block diagram illustrating a configuration of the PSD generating unit 950. FIG. 4 is a flowchart showing operations of the PSD generating unit 950. The PSD generating unit 950 includes a first PSD estimating unit 951 and a second PSD estimating unit 952, as illustrated in FIG. 3.

The operations of the PSD estimating unit 950 will be described following FIG. 4.

In S951, the first PSD estimating unit 951 takes the first enhanced signals $Y_{\theta\_S}(\omega, \tau)$ generated in S930 and the second enhanced signals $Y_{\theta\_j}(\omega, \tau)$ (j=1, ..., L−1) generated in S940 as input. The first PSD estimating unit 951 then performs local PSD estimation using the first enhanced signals $Y_{\theta\_S}(\omega, \tau)$ and the second enhanced signals $Y_{\theta\_j}(\omega, \tau)$ (j=1, ..., L−1), thereby estimating the target sound PSD~$\varphi_S(\omega, \tau)$ and the interference noise PSD ~$\varphi_{IN}(\omega, \tau)$, which are output. Local PSD estimation is a technique for estimating the target sound PSD and the interference noise PSD, using difference in gain on the basis of spatial positions of the target sound and the interference noise. The relation between PSD $\varphi^{BF}(\omega, \tau)=[\varphi_0^{BF}(\omega, \tau), \varphi_1^{BF}(\omega, \tau), \ldots, \varphi_{L-1}^{BF}(\omega, \tau)]^T \in R^L$ of the first enhanced signals $Y_{\theta\_S}(\omega, \tau)$ and L−1 second enhanced signals $Y_{\theta\_j}(\omega, \tau)$, and PSD $\varphi^G(\omega, \tau)=[\varphi_0^G(\omega, \tau), \varphi_1^G(\omega, \tau), \ldots, \varphi_{N-1}^G(\omega, \tau)]^T \in R^N$ of target sound and interference noise grouped in N (where N is an integer or two or more) directions can be approximately expressed as in a form of linear transform as in the following Expression.

$$\underbrace{\begin{bmatrix} \varphi_0^{BF}(\omega, \tau) \\ \vdots \\ \varphi_{L-1}^{BF}(\omega, \tau) \end{bmatrix}}_{\varphi^{BF}(\omega,\tau)} = \underbrace{\begin{bmatrix} |D_{0,0}(\omega)|^2 & \cdots & |D_{0,N-1}(\omega)|^2 \\ \vdots & \ddots & \vdots \\ |D_{L-1,0}(\omega)|^2 & \cdots & |D_{L-1,N-1}(\omega)|^2 \end{bmatrix}}_{D_{power}(\omega)} \underbrace{\begin{bmatrix} \varphi_0^G(\omega, \tau) \\ \vdots \\ \varphi_{N-1}^G(\omega, \tau) \end{bmatrix}}_{\varphi^G(\omega,\tau)} \quad [\text{Math. 3}]$$

Note, however, that $\varphi_0^{BF}(\omega\tau)$ is the PSD of the first enhanced signals $Y_{\theta\_S}(\omega, \tau)$. Accordingly, $\varphi_0^{BF}(\omega, \tau)=|Y_{\theta\_S}(\omega, \tau)|^2$ holds. Also, $D_{j,n}(\omega) \in R^{L'N'Q}$ is sensitivity as to direction n at the angular frequency bin ω and beamformer j. Here, beamformer 0 is the beamformer at the target sound direction-of-arrival $\theta_S$, and beamformer j is beamformers of directions $\theta_j$ other than the target sound direction-of-arrival.

Solving this Expression yields $\varphi^G(\omega, \tau) \in R^N$. That is to say, first, the first PSD estimating unit 951 solves this expression to obtain $\varphi^G(\omega, \tau) \in R^N$.

$$\varphi^G(\omega,\tau)=[D_{power}{}^*(\omega)\varphi^{BF}(\omega,\tau)]_+ \quad [\text{Math. 4}]$$

Here, •* and [•]+ respectively indicate a pseudo-inverse matrix and an operator that makes each element of the matrix to be a non-negative value.

Note that in order to reduce computation amount, performing PSD estimation with a frequency filter bank integrated into several frequency bands is effective.

In the above Expression, assuming that the PSD of the sound source of the target sound direction-of-arrival $\theta_S$ is included at direction 0, and the PSD of a group at a different direction from the target sound is included at direction 1 through direction N−1, the target sound PSD ~$\varphi_S(\omega, \tau)$ and the interference noise PSD ~$\varphi_{IN}(\omega, \tau)$ are estimated by the following Expression. That is to say, next, the first PSD estimating unit 951 estimates the target sound PSD ~$\varphi_S(\omega, \tau)$ and the interference noise PSD ~$\varphi_{IN}(\omega, \tau)$ by the following Expressions.

$$\tilde{\varphi}_S(\omega, \tau) = \varphi_0^G(\omega, \tau)$$

$$\tilde{\varphi}_{IN}(\omega, \tau) = \sum_{n=1}^{N-1} \varphi_n^G(\omega, \tau) \quad [\text{Math. 5}]$$

In S952, the second PSD estimating unit 952 takes the target sound PSD ~$\varphi_S(\omega, \tau)$ and the interference noise PSD ~$\varphi_{IN}(\omega, \tau)$ estimated in S951 as input, and estimates and outputs the target sound PSD $\varphi_S(\omega, \tau)$, the interference noise PSD $\varphi_{IN}(\omega, \tau)$, and the background noise PSD $\varphi_{BN}(\omega, \tau)$, using the target sound PSD ~$\varphi_S(\omega, \tau)$ and the interference noise PSD ~$\varphi_{IN}(\omega, \tau)$. The estimation method will be described below. The background noise can be assumed to be steady. Accordingly, first, the second PSD estimating unit 952 uses PSD $\dot{\varphi}_S(\omega, \tau)$, $\dot{\varphi}_{IN}(\omega, \tau)$, smoothed by recursive smoothing computation, to calculate two background noise PSDs $\varphi_{BN\_S}(\omega, \tau)$, $\varphi_{BN\_IN}(\omega, \tau)$ as minimums in a certain section Γ.

$$\varphi_{BN_S}(\omega,\tau)=\min\{\dot{\varphi}_S(\omega,\tau-\Gamma), \ldots, \dot{\varphi}_S(\omega,\tau)\}$$

$$\varphi_{BN_{IN}}(\omega,\tau)=\min\{\dot{\varphi}_{IN}(\omega,\tau-\Gamma), \ldots, \dot{\varphi}_{IN}(\omega,\tau)\}$$

$$\dot{\varphi}_S(\omega,\tau)=\beta_S\tilde{\varphi}_S(\omega,\tau)+(1-\beta_S)\tilde{\varphi}_S(\omega,\tau-1)(0<\beta_S\leq 1)$$

$$\dot{\varphi}_{IN}(\omega,\tau)=\beta_{IN}\tilde{\varphi}_{IN}(\omega,\tau)+(1-\beta_{IN})\tilde{\varphi}_{IN}(\omega,\tau-1)(0<\beta_{IN}\leq 1) \quad [\text{Math. 6}]$$

Here, $\beta_S$ and $\beta_{IN}$ are each forgetting coefficients. Note that $\beta_S$ and $\beta_{IN}$ are decided taking into consideration temporal energy change of the target sound, interference noise, and background noise.

The second PSD estimating unit 952 then estimates the target sound PSD $\varphi_S(\omega, \tau)$, interference noise PSD $\varphi_{IN}(\omega, \tau)$, and background noise PSD $\varphi_{BN}(\omega, \tau)$, by the following Expressions.

$$\varphi_S(\omega,\tau)=\tilde{\varphi}_S(\omega,\tau)-\varphi_{BN_S}(\omega,\tau)$$

$$\varphi_{IN}(\omega,\tau)=\tilde{\varphi}_{IN}(\omega,\tau)-\varphi_{BN_{IN}}(\omega,\tau)$$

$$\varphi_{BN}(\omega,\tau)=\tilde{\varphi}_{BN_S}(\omega,\tau) \quad [\text{Math. 7}]$$

In S960, the sound source enhancing unit 960 takes, as input, the first enhanced signals $Y_{\theta\_S}(\omega, \tau)$ generated in S930, and the target sound PSD $\varphi_S(\omega, \tau)$, interference noise PSD $\varphi_{IN}(\omega, \tau)$, and background noise PSD $\varphi_{BN}(\omega, \tau)$, generated in S950. The sound source enhancing unit 960 then uses the first enhanced signals $Y_{\theta\_S}(\omega, \tau)$, target sound PSD $\varphi_S(\omega, \tau)$, interference noise PSD $\varphi_{IN}(\omega, \tau)$, and background noise PSD $\varphi_{BN}(\omega, \tau)$, to generate and output frequency region target sound signals $Z(\omega, \tau) \in C$. Specifically, the sound source enhancing unit 960 calculates the frequency region target sound signals $Z(\omega, \tau)$ from the following Expression, using a Weiner filter calculated from the target sound PSD $\varphi_S(\omega, \tau)$, interference noise PSD $\varphi_{IN}(\omega, \tau)$, and background noise PSD $\varphi_{BN}(\omega, \tau)$.

$$Z(\omega, \tau) = \frac{\varphi_S(\omega, \tau)}{\varphi_S(\omega, \tau) + \varphi_{IN}(\omega, \tau) + \varphi_{BN}(\omega, \tau)} Y_{\theta_S}(\omega, \tau) \quad [\text{Math. 8}]$$

In S970, the temporal region transform unit 970 takes the frequency region target sound signals $Z(\omega, \tau)$ generated in S960 as input, and generates and outputs temporal region target sound frequency region observation signals $z(t) \in R$ by transform of the frequency region target sound signals $Z(\omega, \tau)$ into the temporal region. Inverse transform of discrete Fourier transform, for example, can be used for performing transform to temporal region.

<<Optimization of PSD>>

A method will be described here regarding optimization of the PSD generated by the technique according to NPL 1, to improve sound source enhancement capabilities in accordance with settings of usage and applications.

There are the following three features in this optimization method.

(1) At least one PSD of the target sound PSD, interference noise PSD, and background noise PSD is optimized.
(2) The optimization processing of (1) is formulated as an optimization problem of a cost function represented as one convex cost term or a sum of a plurality of convex cost terms relating to a variable representing the PSD, under constraints relating to the PSD.
(3) The optimization problem of (2) is defined using the constraint or convex cost term of (a), the constraint of (b), the constraint or convex cost term of (c), listed below, for example. Note however, that two or more may be used out of the constraint or convex cost term of (c). Also, including the constraint or convex cost term of (a), the constraint of (b), is not indispensable.
 (a) constraint or convex cost term based on assumption that a certain level of estimation has been achieved by the conventional PSD estimation (i.e., output of the PSD estimating unit 950)
 (b) non-negative constraint of PSD
 (c) constraint or convex cost term relating to PSD, based on structure of sound source Note that here, the structure of sound source means the frequency structure, temporal structure, and spatial structure (inter-channel structure) of the target sound, interference noise, and background noise.

In the above optimization problem, constraints relating to PSD are expressed by linear equalities or inequalities, and cost functions are expressed as functions combining one or more convex cost terms relating to a variable representing PSD (cost term that is a closed proper convex function). That is to say, the optimization problem is a convex optimization problem with linear constraint. The optimized PSD is then obtained as the solution to this optimization problem.

One or more convex cost terms and zero or more constraints are used for this convex optimization problem with linear constraint. Increasing convex cost terms or constrains makes the optimization problem complicated, but can be solved with a low computation amount to a degree that enables real-time sound source enhancement processing by using later-described Bregman monotone operator splitting (B-MOS: Bregman Monotone Operator Splitting).

Hereinafter, the target sound PSD $\varphi Ds(\omega, \tau)$, interference noise PSD $\varphi_{IN}(\omega, \tau)$, and background noise PSD $\varphi_{BN}(\omega, \tau)$, estimated by the second PSD estimating unit 952 will be respectively written as $\hat{\varphi}_S(\omega, \tau)$, $\hat{\varphi}_{IN}(\omega, \tau)$, and $\hat{\varphi}_{BN}(\omega, \tau)$.

(1: Specific Examples of Constraints and Convex Cost Terms)

Specific examples of constraints and convex cost terms for (a) through (c) will be described here. The constraints or convex cost terms of (c) can be classified as follows.
 (c-1) constraints or convex cost terms based on frequency structure of sound source
 (c-2) constraints or convex cost terms based on temporal structure of sound source
 (c-3) constraints or convex cost terms based on spatial structure (inter-channel structure) of sound source First, variables that are the object of optimization in an optimization problem will be described.

(1-1: Definition of Variables)

PSD is organized in optional frequency bands. The number of frequency bands here is $\Omega$.

A variable representing the target sound PSD, a variable representing the interference noise PSD, and a variable representing the background noise PSD, in time frame $\tau$, are $u_{S,\tau}$, $u_{IN,\tau}$, and $u_{BN,\tau}$, respectively. Also, a target sound PSD input value, an interference noise PSD input value, and a background noise PSD input value, in time frame $\tau$, are $\hat{\varphi}_{S,\tau}$, $\hat{\varphi}_{IN,\tau}$, and $\hat{\varphi}_{BN,\tau}$, respectively. That is to say, $$u_{i,\tau}=[\varphi_i(0,\tau),\ldots,\varphi_i(\Omega-1,\tau)]^T i\in\{S,IN,BN\}$$

$$\hat{\varphi}_{i,\tau}=[\hat{\varphi}_i(0,\tau),\ldots,\hat{\varphi}_i(\Omega-1,\tau)]^T i\in\{S,IN,BN\} \quad [\text{Math. 9}]$$

hold. Also, $u=[u_{S,\tau}^T, u_{IN,\tau}^T, u_{BN,\tau}^T]^T$, and $\hat{\varphi}_\tau=[\hat{\varphi}_{S,\tau}^T, \hat{\varphi}_{IN,\tau}^T, \hat{\varphi}_{BN,\tau}^T]^T$ hold.

Also, $c_\tau \in R^\Omega$ is defined by the following Expression for PSD $\varphi_{Y\_S}$ s of the first enhanced signals in time frame $\tau$ (i.e., signals beamformed in target sound direction-of-arrival $\theta_S$) $Y_{\theta\_S}(\omega, \tau)$.

$$c_\tau = \left[\varphi_{Y_{S_\theta}}(0, \tau), \ldots, \varphi_{Y_{S_\theta}}(\Omega-1, \tau)\right]^T \quad [\text{Math. 10}]$$

Accordingly, $c_\tau$ is the PSD estimation value of enhanced signals of the sound source at the target sound direction-of-arrival $\theta_S$ in time frame $\tau$.

Hereinafter, in cases of describing constraints or convex cost terms that are not dependent on preceding or following time frames, the time frame index $\tau$ will be omitted.

(1-2: Constraint or Convex Cost Term Based on Assumption that Certain Level of Estimation has Been Achieved by Conventional PSD Estimation (i.e., Output of PSD Estimating Unit 950))

The value of the variable $u=[u_S^T, u_{IN}^T, u_{BN}^T]^T$ is assumed to be a value close to the PSD input value $\hat{\varphi}=[\hat{\varphi}_S^T, \hat{\varphi}_{IN}^T, \hat{\varphi}_{BN}^T]^T$. A convex cost term corresponding to this assumption can be expressed by a quadratic function such as in the following Expressions, for example.

$$L(u_S) = \frac{w_S}{2}\|u_S - \hat{\varphi}_S\|_2^2 \quad [\text{Math. 11}]$$

$$L(u_{IN}) = \frac{w_{IN}}{2}\|u_{IN} - \hat{\varphi}_{IN}\|_2^2$$

$$L(u_{BN}) = \frac{w_{BN}}{2}\|u_{BN} - \hat{\varphi}_{BN}\|_2^2$$

Here, $w_i \in R^+$ ($i \in \{S, IN, BN\}$) is a coefficient for adjusting weighting of convex cost terms (weighting coefficient). Note that $R^+$ represents a set of positive real numbers.

These convex cost terms may also be combined and used. For example, in a case of optimizing the three PSDs of the target sound, interference noise, and background noise, convex cost terms such as in the following Expression can be used.

$$L(u)=L(u_S)+L(u_{IN})+L(u_{BN}) \quad [\text{Math. 12}]$$

(1-3: Non-Negative Constraint of PSD)

PSDs are non-negative values. Accordingly, constraints can be applied by inequalities of $u_S \geq 0$, $u_{IN} \geq 0$, $u_{BN} \geq 0$, i.e., $u \geq 0$.

(1-4: Constraint or Convex Cost Term Based on Frequency Structure of Sound Source)

The frequency structure of the target sound will be described here as one example.

The target sound PSD input value $\hat{\varphi}_S$ contains interference noise PSD and background noise PSD that have not completely been split, as small values. In a case where the target sound is speech, for example, the harmonic structure of the target sound PSD can be assumed, and accordingly prior knowledge such as being sparce in the frequency direction, that there is an overtone structure in the frequency direction, that there is co-occurrence relations in frequency bands adjacent to overtones, and so forth, and be used. Accordingly, it is anticipated that the target sound PSD and noise PSD (i.e., interference noise PSD and background noise PSD) can be split by using constraints and convex cost terms based on such prior knowledge. Accordingly, convex cost terms corresponding to the above assumption will be expressed using an Li norm. Note however, that sparce target sound PSD is estimated in a region weighted using $\Lambda \in R^{\Omega \times \Omega}$, to keep from deleting components that are small values but are auditorily important. Also, in order to stabilize the optimization algorithm, a squared error of a signal where the target sound PSD input value $\hat{\varphi}_S$ is transformed by $\Lambda$ is added to the cost term. To summarize the above, the cost term of the target can be expressed by the following Expression.

$$L(u_S) = \mu \|\Lambda u_S\|_1 + \frac{\rho}{2}\|\Lambda u_S - \Lambda \hat{\varphi}_S\|_2^2 \quad \text{[Math. 13]}$$

Here, $\mu$, $\rho (\in R^+)$ are weighting coefficients. Also, $\Lambda$ ($\in R^{\Omega \times \Omega}$) is a predetermined sparce matrix.

Specific examples of $\Lambda \in R^{\Omega \times \Omega}$ a are the following ($\alpha$) and ($\beta$). These ($\alpha$) and ($\beta$) may be combined.

($\alpha$) frequency weighting matrix $\Lambda_w$ $$\Lambda_w = \begin{pmatrix} \lambda_0 & 0 & \cdots & 0 \\ 0 & \lambda_1 & \cdots & 0 \\ \vdots & \vdots & \ddots & \vdots \\ 0 & 0 & \cdots & \lambda_{\Omega-1} \end{pmatrix} (\lambda_i \in R^+) \quad \text{[Math. 14]}$$

($\beta$) matrix $\Lambda_{nb}$ for smoothing with adjacent frequency band

In a case of taking the moving average with one band to each of the left and the right, the matrix $\Lambda_{nb}$ is as in the following Expression.

$$\Lambda_{nb} = \begin{pmatrix} 1 & 1 & 0 & 0 & \cdots & 0 \\ 1 & 1 & 1 & 0 & \cdots & 0 \\ 0 & 1 & 1 & 1 & \cdots & 0 \\ \vdots & \vdots & \vdots & \vdots & \ddots & \vdots \\ 0 & 0 & 0 & 0 & \cdots & 1 \end{pmatrix} \quad \text{[Math. 15]}$$

(1-5: Constraints or Convex Cost Terms Based on Temporal Structure of Sound Source)

Smoothing with the PSD of the immediately-preceding time frame will be described here as one example.

Suppression of distortion can be anticipated by assuming that the value of PSD will smoothly change between preceding and following time frames. A convex cost term corresponding to this assumption can be expressed as a term using a squared error such as in the following Expression, for example.

$$L(u_{BN,\tau}) = \frac{\gamma_{BN}}{2}\|\hat{\varphi}_{BN,\tau-1} - u_{BN,\tau}\|_2^2 \quad \text{[Math. 16]}$$

Note that $\hat{\varphi}_{BN,\tau-1}$ is a background noise PSD estimation value at time frame $\tau-1$. Also, $\gamma_{BN}$ ($\in R^+$) is a weighting coefficient.

Estimation of background noise PSD that is smooth in the temporal direction can be performed by minimizing this cost term. Note that in a case in which the target sound or interference noise is singing, musical instruments, or the like, for example, the target sound and the interference noise are also smooth in the temporal direction, and accordingly a convex cost term such as in the above Expression for background noise can be used for the target sound and interference noise as well (see following Expressions).

$$L(u_{S,\tau}) = \frac{\gamma_S}{2}\|\hat{\varphi}_{S,\tau-1} - u_{S,\tau}\|_2^2 \quad \text{[Math. 17]}$$

$$L(u_{IN,\tau}) = \frac{\gamma_{IN}}{2}\|\hat{\varphi}_{IN,\tau-1} - u_{IN,\tau}\|_2^2$$

Note however, that $\hat{\varphi}_{S,\tau-1}$ and $\hat{\varphi}_{IN,\tau-1}$ respectively are target sound PSD estimation value at time frame $\tau-1$, and interference noise PSD estimation value at time frame $\tau-1$. Also, $\gamma_S$, $\gamma_{IN}$ ($\in R^+$) are weighting coefficients.

(1-6: Constraints or Convex Cost Terms Based on Spatial Structure of Sound Source)

Additivity constraint of PSD will be described here as an example.

Assuming additivity of PSD in the frequency region, the sum of target sound PSD, interference noise PSD, and background noise PSD is close to a PSD estimation value c of enhanced signals of the sound source at the target sound direction-of-arrival $\theta_S$. A constraint regarding this assumption can be expressed by the following linear constraint, for example.

$$u_S + u_{IN} + u_{BN} = c \quad \text{[Math. 18]}$$

It is anticipated that by using this constraint, distortion will be reduced and components lost in upstream processing (i.e., at the output of the PSD generating unit 950) will be restored, consequently improving PSD estimation precision.

(1-7: Summarization)

To summarize the above, the optimization problem is an optimization problem for a cost function relating to the variable $u_S$, the variable $u_{IN}$, and the variable $u_{BN}$, and is defined using at least one of the convex cost terms described below. Now, these convex cost terms are (1) constraints relating to frequency structure of the sound source or convex cost terms relating to frequency structure of the sound source, (2) constraints relating to temporal structure of the sound source or convex cost terms relating to temporal structure of the sound source, and (3) constraints relating to spatial structure of the sound source or convex cost terms relating to spatial structure of the sound source.

Note that the optimization problem may be defined in a form in which a constraint or convex cost term based on assumption that a certain level of estimation has been achieved by the conventional PSD estimation (i.e., output of the PSD estimating unit 950) and non-negative constraint of PSD are used in conjunction, as a matter of course.

(2: Application Example)

A specific example of the optimization problem, and an optimization algorithm for solving this optimization problem, will be described here.

A problem defined using the constraints and convex cost terms of (a), (b), (c-1), and (c-3), will be considered as a specific example of the optimization problem.

$$\inf_{u,v} F_1(u) + F_2(v) \text{ s.t. } Au = v, Bu = c, u \geq 0 \qquad \text{[Math. 19]}$$

$$F_1(u) = \frac{1}{2}\|W^{1/2}(u - \hat{\varphi})\|_2^2$$

$$F_2(v) = \mu\|v\|_1 + \frac{\rho}{2}\|v - \hat{v}_{\hat{\varphi}S}\|_2^2$$

Here, $\mu$, $\rho (\in R^+)$ are weighting coefficients. Also, with $\Lambda (\in R^{\Omega \times \Omega})$ as a predetermined sparse matrix, and $I (\in R^{\Omega \times \Omega})$ as an identity matrix, matrices A and B, vectors c and $\hat{v}_{\hat{\varphi}\_S}$, and matrices W and $W^{1/2}$, are given by the following Expressions.

$$A = [\Lambda \ 0 \ 0], B = [I \ I \ I] \qquad \text{[Math. 20]}$$

$$c = \varphi_{Y_{S_\theta}}, \hat{v}_{\hat{\varphi}S} = A\hat{\varphi}$$

$$W = \begin{bmatrix} w_S I & 0 & 0 \\ 0 & w_{IN} I & 0 \\ 0 & 0 & w_{BN} I \end{bmatrix}, W^{1/2} = \begin{bmatrix} \sqrt{w_S I} & 0 & 0 \\ 0 & \sqrt{w_{IN} I} & 0 \\ 0 & 0 & \sqrt{w_{BN} I} \end{bmatrix}$$

$(w_S, w_{IN}, w_{BN} \in R^+)$

The cost function $F_1+F_2$ in this optimization problem uses, besides a latent variable u, an auxiliary variable v of the latent variable u. Also, constraints of this optimization problem are linear constraints regarding the variables u and v, i.e., Au=v, Bu=c, u≥0.

Solving a dual problem instead of solving the above optimization problem will be considered. The dual problem is shown in the following Expression.

$$\sup_{p,q,r \geq 0} \inf_{u,v} F_1(u) + F_2(v) + \langle p, v - Au \rangle + \langle q, c - Bu \rangle - \langle r, u \rangle \qquad \text{[Math. 21]}$$

By organizing dual variables p, q, and r as $\zeta=[p, q, r]^T$, the dual problem can be expressed as in the following Expression.

$$\inf_\zeta \underbrace{F_1^*(A^T p + B^T q + r) - q^T c}_{G_1(\zeta)} + \underbrace{F_2^*(-p) + I_{(r \geq 0)}(r)}_{G_2(\zeta)} \qquad \text{[Math. 22]}$$

Here, $F_1^*$ and $F_2^*$ are convex conjugate functions of $F_1$ and $F_2$, and are expressed as in the following Expressions.

$$F_1^*(A^T p + B^T q + r) = \sup_u (\langle u, A^T p + B^T q + r \rangle - F_1(u)) \qquad \text{[Math. 23]}$$

$$F_2^*(-p) = \sup_v (\langle v, -p \rangle - F_2(v))$$

Also, $I_{(r \geq 0)}$ (r) is an indicator function that guarantees the non-negativity of r.

$$I_{(r \geq 0)}(r) = \begin{cases} 0(r_\omega \geq 0, \omega \in \{0, \ldots, \Omega - 1\}) \\ +\infty (\text{otherwise}) \end{cases} \qquad \text{[Math. 24]}$$

It can be seen from the above that the cost function of the dual problem is expressed as the sum of two closed proper convex functions $G_1$ and $G_2$.

In order to realize sound source enhancement in real time, an algorithm is necessary that solves the above dual problem $\inf_\zeta G_1(\zeta)+G_2(\zeta)$ at high speeds. The Bregman monotone operator splitting (B-MOS) disclosed in reference NPL 1 is used here.

(Reference NPL 1: K. Niwa and W. B. Kleijn, "Bregman monotone operator splitting", https://arxiv.org/abs/1807.04871, 2018.)

Specifically, a Bregman-Peaceman-Rachfold (B-P-R) type optimization solver is used. The B-P-R type optimization solver uses a recursive update expression obtained from a fixed-point condition where $0 \in \partial G_1(\zeta)+\partial G_2(\zeta)$.

$$\zeta \in C_2 C_1(\zeta) \qquad \text{[Math. 25]}$$

This Expression is configured using the following D-Cayley operator $C_i$.

$$C_i = (I - (\nabla D)^{-1} \partial G_i)(I + (\nabla D)^{-1} \partial G_i)^{-1} \qquad \text{[Math. 26]}$$
$$= 2R_i - I (i = 1, 2)$$

Here, $\cdot^{-1}$ represents inverse mapping. Also, D is a function used for defining Bregman divergence. A function that satisfies $\nabla D(0)=0$, and in which $\nabla D$ is a strongly convex function that is differentiable, is used as the function D.

Also, $R_i$ and I are respectively a D-resolvent operator and an identity operator, and the D-resolvent operator $R_i$ is given by the following Expression.

$$R_i = (I + (\nabla D)^{-1} \partial G_i)^{-1} (i=1,2) \qquad \text{[Math. 27]}$$

The optimization algorithm shown in FIG. 3 is obtained from the above update expression. It can be seen from FIG. 3 that dual variables $\bar{p}=\nabla D_p(p)$, $\bar{q}=\nabla D_q(q)$, and $\bar{r}=\nabla D_r(r)$, obtained by nonlinear transform of (primary) variable u, auxiliary variable v, and dual variables p, q, and r, respectively, are alternately updated. Note that strongly convex functions $D_p$, $D_q$, and $D_r$ are each given by the following Expressions.

$$D_p(p) = \frac{1}{2} \langle AW^{-1} A^T p, p \rangle \qquad \text{[Math. 28]}$$

$$D_q(q) = \frac{1}{2} \langle BW^{-1} B^T q, q \rangle$$

$$D_r(r) = \frac{1}{2} \langle W^{-1} r, r \rangle$$

Accordingly, $\nabla D_p$, $\nabla D_q$, and $\nabla D_r$ are respectively given by the following Expressions.

$$\nabla D_p = AW^{-1} A^T$$

$$\nabla D_q = BW^{-1} B^T$$

$$\nabla D_r = W^{-1} \qquad \text{[Math. 29]}$$

Accordingly, the gradients of the strongly convex functions $D_p$, $D_q$, and $D_r$ at zero are 0.

Also, Bregman divergence is used in the regularization term of the proximal operator in updating of the primary variable u in the algorithm in FIG. 3 (see following Expression).

$$J_{D_p}(Au\|\bar{p}) = D_p^*(Au) - D_p^*(\bar{p}) - \langle \nabla D_p^*(\bar{p}), Au - \bar{p} \rangle \qquad \text{[Math. 30]}$$

Here, $D_p^* = D_p^{-1}$.

Generally, $\nabla(D^{-1}) = (\nabla D)^{-1}$ holds with respect to the differential operator of the strongly convex function D, and accordingly $\nabla D_p^* = \nabla(D_p^{-1}) = (\nabla D_p)^{-1} = (AWA^T)^*$ holds. This is the same for $\nabla D_q^*$ and $\nabla D_r^*$ as well. Accordingly, $\nabla D_p^*$, $\nabla D_q^*$, and $\nabla D_r^*$ are given by the following Expressions.

$$\nabla D_p^* = (AW^{-1}A^T)^*$$

$$\nabla D_q^* = (BW^{-1}B^T)^*$$

$$\nabla D_r^* = (W^{-1})^* \qquad \text{[Math. 31]}$$

In the algorithm in FIG. 3, T is a constant that represents an iteration count, and needs to be set to a small value when processing in real time.

First Embodiment

A sound source enhancement device 100 will be described below with reference to FIG. 6 and FIG. 7. FIG. 6 is a block diagram illustrating a configuration of the sound source enhancement device 100. FIG. 7 is a flowchart showing operations of the sound source enhancement device 100. The sound source enhancement device 100 includes the microphone array 910, the frequency region transform unit 920, the first beamformer unit 930, the second beamformer unit 940, the PSD generating unit 950, a PSD updating unit 150, the sound source enhancing unit 960, the temporal region transform unit 970, and the recording unit 990, as illustrated in FIG. 6. The sound source enhancement device 100 differs from the sound source enhancement device 900 only with respect to the point of further including the PSD updating unit 150.

Operations of the sound source enhancement device 100 will be described following FIG. 7.

In S910, the microphone array 910, which is made up of M (where M is an integer of 2 or greater) microphone elements, generates and outputs temporal region observation signals $x_m(t)$ (m=0, 1, ..., M−1) collected by a microphone element m.

In S920, the frequency region transform unit 920 takes the temporal region observation signals $x_m(t)$ (m=0, 1, ..., M−1) generated in S910 as input and, and transforms each of the temporal region observation signals $x_m(t)$ (m=0, 1, ..., M−1) into frequency region, thereby generating frequency region observation signals $X_m(\omega, \tau)$ (m=0, 1, ..., M−1), which are output.

In S930, the first beamformer unit 930 takes the frequency region observation signals $x_m(\omega, \tau)$ (m=0, 1, ..., M−1) generated in S920 as input, and generates and outputs enhanced signals $Y_{\theta\_S}(\omega, \tau)$ of a sound source at a target sound direction-of-arrival $\theta_S$ (hereinafter referred to as first enhanced signals $Y_{\theta\_S}(\omega, \tau)$) by performing linear filtering of the frequency region observation signals $X_m(\omega, \tau)$ (m=0, 1, ..., M−1).

In S940, the second beamformer unit 940 takes the frequency region observation signals $X_m(\omega, \tau)$ (m=0, 1, ..., M−1) generated in S920 as input, and generates and outputs L−1 (where L−1 is an integer that is K or greater) enhanced signals $Y_{\theta\_j}(\omega, \tau)$ (j=1, ..., L−1) of sound sources of directions $\theta_j$ other than the target sound direction-of-arrival (hereinafter referred to as second enhanced signals $Y_{\theta\_j}(\omega, \tau)$) by performing linear filtering of the frequency region observation signals $X_m(\omega, \tau)$ (m=0, 1, ..., M−1).

In S950, the PSD generating unit 950 takes the first enhanced signals $Y_{\theta\_S}(\omega, \tau)$ generated in S930 and the second enhanced signals $Y_{\theta\_j}(\omega, \tau)$ (j=1, ..., L−1) generated in S940 as input, and generates and outputs target sound PSD $\hat{\varphi}_S(\omega, \tau)$, interference noise PSD $\hat{\varphi}_{IN}(\omega, \tau)$, and background noise PSD $\hat{\varphi}_{BN}(\omega, \tau)$, using the first enhanced signals $Y_{\theta\_S}(\omega, \tau)$ and the second enhanced signals $Y_{\theta\_j}(\omega, \tau)$ (j=1, ..., L−1). Note that although the is affixed here to the signs representing the target sound PSD, the interference noise PSD, and the background noise PSD, the operations of the PSD generating unit 950 in S950 are the same as those described by way of FIG. 3 and FIG. 4 in the <Technical Background>.

Hereinafter, the target sound PSD $\hat{\varphi}_S(\omega, \tau)$, the interference noise PSD $\hat{\varphi}_{IN}(\omega, \tau)$, and the background noise PSD $\hat{\varphi}_{BN}(\omega, \tau)$ will be referred to as target sound PSD input value $\hat{\varphi}_S(\omega, \tau)$, interference noise PSD input value $\hat{\varphi}_{IN}(\omega, \tau)$, and background noise PSD input value $\hat{\varphi}_{BN}(\omega, \tau)$. Also, $u_S$ is a variable representing the target sound PSD, $u_{IN}$ is a variable representing the interference noise PSD, and $u_{BN}$ is a variable representing the background noise PSD.

In S150, the PSD updating unit 150 takes the target sound PSD input value $\hat{\varphi}_S(\omega, \tau)$, the interference noise PSD input value $\hat{\varphi}_{IN}(\omega, \tau)$, and the background noise PSD input value $\hat{\varphi}_{BN}(\omega, \tau)$, generated in S950, as input, and solves the optimization problem for the cost function relating to the variable $u_S$, the variable $u_{IN}$, and the variable $u_{BN}$, thereby generating and outputting a target sound PSD output value $\varphi_S(\omega, \tau)$, an interference noise PSD output value $\varphi_{IN}(\omega, \tau)$, and a background noise PSD output value $\varphi_{BN}(\omega, \tau)$. That is to say, the PSD updating unit 150 is a component that solves the optimization problem described in the <Technical Background>. This optimization problem is an optimization problem for a cost function relating to the variable $u_S$, the variable $u_{IN}$, and the variable $u_{BN}$, and is defined using at least one of the convex cost terms described below. Now, these convex cost terms are (1) constraints relating to frequency structure of the sound source or convex cost terms relating to frequency structure of the sound source, (2) constraints relating to temporal structure of the sound source or convex cost terms relating to temporal structure of the sound source, and (3) constraints relating to spatial structure of the sound source or convex cost terms relating to spatial structure of the sound source.

An example of the constraints and convex cost terms of (1) through (3) will be described below. For example, as a convex const term L relating to the frequency structure of the sound source, $$L(u_S) = \mu \|\Lambda u_S\|_1 + \frac{\rho}{2} \|\Lambda u_S - \Lambda \hat{\varphi}_S\|_2^2 \qquad \text{[Math. 32]}$$

(where $\mu, \rho (\in R^+)$ are weighting coefficients, $\Lambda (\in R^{\Omega \times \Omega})$ is a predetermined sparse matrix, and $\Omega$ is the number of frequency bands) can be used.

Also, for example, as a convex cost term L relating to the temporal structure of the sound source, with $u_{BN,\tau}$ as a variable representing the background noise PSD at time frame $\tau$, $\hat{\varphi}_{BN,\tau-1}$ as the background noise PSD estimation value at time frame $\tau-1$, $u_{S,\tau}$ as a variable representing the target sound PSD at time frame $\tau$, $\hat{\varphi}_{S,\tau-1}$ as a target sound PSD estimation value at time frame $\tau-1$, $u_{IN,\tau}$ as a variable representing the interference noise PSD at time frame $\tau$, and $\hat{\varphi}_{IN,\tau-1}$ as an interference noise PSD estimation value at time frame $\tau-1$, $$L(u_{BN,\tau}) = \frac{\gamma_{BN}}{2}\|\hat{\varphi}_{BN,\tau-1} - u_{BN,\tau}\|_2^2 \quad \text{[Math. 33]}$$

$$L(u_{S,\tau}) = \frac{\gamma_S}{2}\|\hat{\varphi}_{S,\tau-1} - u_{S,\tau}\|_2^2$$

$$L(u_{IN,\tau}) = \frac{\gamma_{IN}}{2}\|\hat{\varphi}_{IN,\tau-1} - u_{IN,\tau}\|_2^2$$

can be used as a convex cost term L relating to the temporal structure of the sound source. Note that $\gamma_{BN}$, $\gamma_S$, and $\gamma_{IN}$ ($\in R^+$) are weighting coefficients.

Also, for example, with c as a PSD estimation value of enhanced signals of the sound source at the target sound direction-of-arrival $\theta_S$, $$u_S + u_{IN} + u_{BN} = c \quad \text{[Math. 34]}$$

can be used as a constraint relating to the spatial structure of the sound source. Note that in this case, the PSD updating unit 150 may take the first enhanced signals $Y_{\theta\_S}(\omega, \tau)$ generated in S930 as input as well, obtain the PSD $\varphi_{\theta\_q\_S}$ of the first enhanced signals $Y_{\theta\_S}(\omega, \tau)$, and use the PSD estimation value c of enhanced signals of the sound source at the target sound direction-of-arrival $\theta_S$ defined by this PSD $\varphi_{Y\_\theta\_S}$.

Also, this optimization problem for the cost function relating to the variable $u_S$, the variable $u_{IN}$, and the variable $u_{BN}$ can be formulated as a problem in which $u=[u_S^T, u_{IN}^T, u_{BN}^T]^T$, and v is an auxiliary variable of the variable u, and $\inf_{u,v} F_1(u) + F_2(v)$ (where $F_1$ and $F_2$ are convex functions) is solved under linear constraints relating to the variables u and v. Now, the linear constraints relating to the variables u and v include at least one of constraints relating to the frequency structure of the sound source, constraints relating to the temporal structure of the sound source, and constraints relating to the spatial structure of the sound source. Alternatively, regarding the linear constraints relating to the variables u and v, $F_1(u) + F_2(v)$ includes at least one of convex cost terms relating to the frequency structure of the sound source, convex cost terms relating to the temporal structure of the sound source, and convex cost terms relating to the spatial structure of the sound source.

An example of the optimization problem formulated in this way will be described below.

Linear constraints regarding the variables u and v are given by the following Expression.

$$Au=v, Bu=c, u\geq 0 \quad \text{[Math. 35]}$$

(where $A=[\Lambda\ 0\ 0]$, $B=[I, I, I]$, c is the PSD estimation value of enhanced signals of the sound source at the target sound direction-of-arrival $\theta_S$, $\Lambda(\in R^{\Omega\times\Omega})$ is a predetermined sparse matrix, $I(\in R^{\Omega\times\Omega})$ is an identity matrix, and $\Omega$ is the number of frequency bands)

Also, $F_1(u)$ and $F_2(v)$ are each given by the following Expressions.

$$F_1(u) = \frac{1}{2}\|W^{1/2}(u - \hat{\varphi})\|_2^2 \quad \text{[Math. 36]}$$

$$F_2(v) = \mu\|v\|_1 + \frac{\rho}{2}\|v - \hat{v}_{\varphi_S}\|_2^2$$

(where $$W^{1/2} = \begin{bmatrix} \sqrt{w_S}I & 0 & 0 \\ 0 & \sqrt{w_{IN}}I & 0 \\ 0 & 0 & \sqrt{w_{BN}}I \end{bmatrix} (w_S, w_{IN}, w_{BN} \in R^+) \quad \text{[Math. 37]}$$

$$\hat{\varphi} = [\hat{\varphi}_S^T, \hat{\varphi}_{IN}^T, \hat{\varphi}_{BN}^T]^T$$

$$\hat{v}_{\varphi_S} = A\hat{\varphi}$$

and $\mu$, $\rho (\in R^+)$ are weighting coefficients)

The PSD updating unit 150 that solves the optimization problem will be described below with reference to FIG. 8 and FIG. 9. FIG. 8 is a block diagram illustrating a configuration of the PSD updating unit 150. FIG. 9 is a flowchart showing operations of the PSD updating unit 150. The PSD updating unit 150 includes an initializing unit 151, a first variable calculating unit 1521, a first dual variable calculating unit 1522, a second dual variable calculating unit 1523, a third dual variable calculating unit 1524, a second variable calculating unit 1525, a fourth dual variable calculating unit 1526, a fifth dial variable calculating unit 1527, a counter updating unit 153, and an ending condition determining unit 154, as illustrated in FIG. 8.

The operations of the PSD updating unit 150 will be described following FIG. 9. Here, functions $D_p^*$, $D_q^*$, and $D_r^*$, and dual variables $\tilde{p}$, $\tilde{q}$, and $\tilde{r}$, defined in the following Expressions regarding the dual variables p, q, and r, are used.

$$D_p^* = D_p^{-1}, D_q^* = D_q^{-1}, D_r^* = D_r^{-1}$$

$$\tilde{p} = \nabla D_p(p), \tilde{q} = \nabla D_q(q), \tilde{r} = \nabla D_r(r) \quad \text{[Math. 38]}$$

In S151, the initializing unit 151 initializes a counter t. Specifically, the initializing unit 151 initializes t to t=0. The initializing unit 151 also initializes the dual variables $\tilde{p}$, $\tilde{q}$, and $\tilde{r}$. Specifically, $\tilde{p}^0$, $\tilde{q}^0$, and $\tilde{r}^0$ are set as initial values of the dual variables $\tilde{p}$, $\tilde{q}$, and $\tilde{r}$ (the result of having updated the dual variables $\tilde{p}$, $\tilde{q}$, and $\tilde{r}$ for the 0'th time).

In S1521, the first variable calculating unit 1521 calculates $u^{t+1}$, which is the result of updating the variable u for a t+1'th time, by the following Expression.

$$u^{t+1} = \quad \text{[Math. 39]}$$
$$\arg\min_u \left( F_1(u) + J_{D_p^*}(Au\|\tilde{p}^t) + J_{D_q^*}(Bu\|\tilde{q}^t - c) + J_{D_r^*}(u\|-\tilde{r}^t) \right)$$

In S1522, the first dual variable calculating unit calculates $\tilde{p}^{t+1/2}$, which is the intermediate updating result of the dual variable $\tilde{p}$ for the t+1'th time, by the following Expression.

$$\tilde{p}^{t+1/2} = \tilde{p}^t - 2Au^{t+1} \quad \text{[Math. 40]}$$

In S1523, the second dual variable calculating unit calculates $\tilde{q}^{t+1}$, which is the result of updating the dual variable $\tilde{q}$ for the t+1'th time, by the following Expression.

$$\tilde{q}^{t+1} = \tilde{q}^t - 2(Bu^{t+1} - c) \quad \text{[Math. 41]}$$

In S1524, the third dual variable calculating unit calculates $\tilde{r}^{t+1/2}$, which is an intermediate updating result of the dual variable $\tilde{r}$ for the t+1'th time, by the following Expression.

$$\tilde{r}^{t+1/2} = \tilde{r}^t - 2u^{t+1} \quad \text{[Math. 42]}$$

In S1525, the second variable calculating unit calculates $v^{t+1}$, which is the result of updating the auxiliary variable v for the t+1'th time, by the following Expression.

$$v^{t+1} = \arg\min_v \left( F_2(v) + J_{D_p^*}(v\|-\tilde{p}^{t+1/2}) \right) \quad \text{[Math. 43]}$$

In S1526, the fourth dual variable calculating unit calculates $^{-}p^{t+1}$, which is the result of updating the dual variable $^{-}p$ for the t+1'th time, by the following Expression.

$$\bar{p}^{t+1}=\bar{p}^{t+1/2}+2v^{t+1} \quad [\text{Math. 44}]$$

In S1527, the fifth dual variable calculating unit sets $^{-}r=[^{-}r_1^T, ^{-}r_2^T, ^{-}r_3^T]^T$, and calculates $^{-}r^{t+1}$, which is the result of updating the dual variable $^{-}r$ for the t+1'th time, by the following Expression.

$$\bar{r}_i^{t+1} = \begin{cases} \bar{r}_i^{t+1/2}(\text{if } \bar{r}_i^{t+1/2} \geq 0) \\ -\bar{r}_i^{t+1/2}(\text{otherwise}) \end{cases} (i = 1, 2, 3) \quad [\text{Math. 45}]$$

In S153, the counter updating unit 125 increments the counter t by 1. Specifically, t–t+1 is set.

In S154, in a case where the counter t has reached a predetermined update count T (where T is a value that is an integer of 1 or greater, and that has been set taking real-time nature into consideration) (i.e., when t>T−1 is reached, and ending conditions are satisfied), the ending condition determining unit 154 outputs a value $u^T$ of the variable u at that time, and ends processing. Otherwise, the flow returns to the processing of S1521. That is to say, the PSD updating unit 150 repeats the processing of S1521 through S154.

In S960, the sound source enhancing unit 960 takes, as input, the first enhanced signals $Y_{\theta\_S}(\omega, \tau)$ generated in S930, and the target sound PSD output value $\varphi_S(\omega, \tau)$, interference noise PSD output value $\varphi_{IN}(\omega, \tau)$, and background noise PSD output value $\varphi_{BN}(\omega, \tau)$, generated in S150. The sound source enhancing unit 960 then uses the first enhanced signals $Y_{\theta\_S}(\omega, \tau)$, target sound PSD output value $\varphi_S(\omega, \tau)$, interference noise PSD output value $\varphi_{IN}(\omega, \tau)$, and background noise PSD output value $\omega_{BN}(\omega, \tau)$, to generate and output frequency region target sound signals $Z(\omega, \tau) \in C$.

In S970, the temporal region transform unit 970 takes the frequency region target sound signals $Z(\omega, \tau)$ generated in S960 as input, and generates and outputs temporal region target sound frequency region observation signals $z(t) \in R$ by transforming the frequency region target sound signals $Z(\omega, t)$ into the temporal region.

Note that the PSD updating unit 150 can be configured as a standalone device (hereinafter referred to as PSD optimization device 200). FIG. 10 is a block diagram illustrating the configuration of the PSD optimization device 200. The PSD optimization device 200 includes the PSD updating unit 150 and the recording unit 990, as illustrated in FIG. 10.

According to the invention of the present embodiment, sound source enhancement capabilities can be efficiently improved in accordance with settings of usage and applications.

<Notes>

FIG. 11 is a diagram illustrating an example of the functional configuration of a computer that realizes the above-described devices. The processing of the above-described devices can be realized by a recording unit 2020 reading in a program for causing the computer to function as the above-described devices, and run by a control unit 2010, an input unit 2030, an output unit 2040, and so forth.

The device according to the present invention, as a standalone hardware entity for example, has an input unit to which a keyboard or the like can be connected, and an output unit to which a liquid crystal display or the like can be connected, a communication unit connectable to a communication device (e.g., communication cable) that can communicate externally from the hardware entity, a CPU (Central Processing Unit, may have cache memory, registers, etc.), RAM and ROM that are memory, an external storage device that is a hard disk, and a bus that connects the input unit, output unit, communication unit, CPU, RAM, ROM, and external storage device so as to be capable of exchanging data therebetween. Also, a device (drive) that can read from and write to a recording medium such as a CD-ROM or the like, and so forth, may be provided to the hardware entity as necessary. Examples of physical entities having such hardware resources include a general purpose computer or the like.

The external storage device of the hardware entity stores programs necessary for realizing the above-described functions, and data and so forth necessary for processing of the programs (this is not limited to the external storage device, and programs may be stored in ROM that is a read-only storage device, for example). Data and so forth obtained by processing performed by these programs is stored in RAM, the external storage device, and so forth, as appropriate.

In the hardware entity, the programs stored in the external storage device (or ROM or the like) and data necessary for processing of the programs are read into memory as necessary, and subjected to interpreting processing by the CPU as appropriate. As a result, the CPU realizes predetermined functions (the components described above as so-and-so unit, so-and-so means, and so forth).

The present invention is not limited to the above-described embodiments, and modifications can be made as appropriate without departing from the essence of the present invention. Also, processing described in the above embodiments is not restricted to being executed in the order of the time sequence described therein, and may be executed in parallel or individually, in accordance with the processing capabilities of the device executing processing, or as necessary.

In a case of realizing the processing functions at the hardware entity (device of the present invention) described in the above embodiments by a computer, the contents of processing for the function which the hardware entity should have are described as a program, as mentioned earlier. Executing this program on a computer realizes the processing functions of the above hardware entity on the computer.

The program describing these contents of processing can be recorded in a computer-readable recording medium. Any computer-readable recording medium may be used, such as magnetic recording devices, optical discs, opto-magnetic recording media, semiconductor memory, and so forth, for example. Specifically, examples of a magnetic recording device that can be used include hard disk devices, flexible disks, magnetic tape, and so forth. Examples of optical discs include DVD (Digital Versatile Disc), DVD-RAM (Random Access Memory), CD-ROM (Compact Disc Read Only Memory), CD-R (Recordable)/RW (ReWritable), and so forth, examples of opto-magnetic recording media include MO (Magneto-Optical disc) and so forth, and examples of semiconductor memory include EEP-ROM (Electronically Erasable and Programmable-Read Only Memory) and so forth.

Also, distribution of this program is performed by sales, transfer, lending, and so forth of a transportable recording medium such as a DVD, CD-ROM, or the like, in which the program is recorded, for example. Further, a configuration for distribution of the program may be made by storing the program in a storage device of a server computer, and transferring the program from the server computer to other computers via a network.

A computer that executes such a program first stores the program recorded in a transportable recording medium or the program transferred from a server computer in its own storage device to begin with, for example. Then, at the time of executing the processing, the computer reads the program stored in its own recording device, and executes processing following the program that has been read out. As a separate form of executing the program, the computer may directly read the program from the transportable recording medium and execute processing following the program. Further, each time the program is transferred from the server computer to this computer, the computer may successively execute processing following the program that has been received. Also, a configuration may be made where the above-described processing is executed by a so-called ASP (Application Service Provider) type service, where the program is not transferred from the server computer to this computer, and the processing functions are realized just by instructions for execution and acquisition of results. Note that the program according to this form includes information provided for processing by electronic computers that is equivalent to programs (data or the like that is not direct instructions to a computer but has a nature of defining processing of the computer).

Also, in this form, the hardware entity is configured by executing a predetermined program on a computer, but at least part of these contents of processing may be realized by hardware.

The above description of the embodiment of the present invention has been given for exemplification and description. The description is not intended to be exhaustive, nor is the invention intended to be strictly limited to the disclosed form. Modifications and variations can be made from the above teachings. The embodiment has been selectively expressed to provide the best exemplification of the principles of the present invention, and to enable one skilled in the art to carry out the present invention in various embodiments that are well thought out to be applied to practical use, with various modifications added thereto. All such modifications and variations are within the scope of the present invention set forth in the attached Claims, as interpreted according to the breadth justly and legally fairly imparted thereto.

The invention claimed is:

1. A power spectral density (PSD) optimization device including a PSD updating unit that, with $u_S$ as a variable representing a target sound PSD, $u_{IN}$ as a variable representing an interference noise PSD, and $u_{BN}$ as a variable representing a background noise PSD, takes a target sound PSD input value $\hat{\varphi}_S(\omega, \tau)$, an interference noise PSD input value $\hat{\varphi}_{IN}(\omega, \tau)$, and a background noise PSD input value $\hat{\varphi}_{BN}(\omega, \tau)$ as input, and generates a target sound PSD output value $\varphi_S(\omega, \tau)$, an interference noise PSD output value $\varphi_{IN}(\omega, \tau)$, and a background noise PSD output value $\varphi_{BN}(\omega, \tau)$, by solving an optimization problem for a cost function relating to the variable $u_S$, the variable $u_{IN}$, and the variable $u_{BN}$, wherein the optimization problem for the cost function is defined using at least one of a constraint relating to a frequency structure of a sound source or a convex cost term relating to the frequency structure of the sound source, a constraint relating to a temporal structure of the sound source or a convex cost term relating to the temporal structure of the sound source, and a constraint relating to a spatial structure of the sound source or a convex cost term relating to the spatial structure of the sound source.

2. The PSD optimization device according to claim 1, wherein a convex cost term L relating to the frequency structure is defined by $$L(u_S) = \mu\|\Lambda u_S\|_1 + \frac{\rho}{2}\|\Lambda u_S - \Lambda\hat{\varphi}_S\|_2^2$$

where $\mu, \rho (\in R^+)$ are weighting coefficients, $\Lambda (\in R^{\Omega \times \Omega})$ is a predetermined sparse matrix, and $\Omega$ is a count of frequency bands.

3. The PSD optimization device according to claim 1, wherein, with $u_{BN,\tau}$ as a variable representing the background noise PSD at a time frame $\tau$, and $\hat{\varphi}_{BN,\tau-1}$ as a background noise PSD estimation value at time frame $\tau-1$, a convex cost term L relating to the temporal structure is defined by $$L(u_{BN,\tau}) = \frac{\gamma_{BN}}{2}\|\hat{\varphi}_{BN,\tau-1} - u_{BN,\tau}\|_2^2$$

where $\gamma_{BN} (\in R^+)$ is a weighting coefficient.

4. The PSD optimization device according to claim 1, wherein, with c as a PSD estimation value of enhanced signals of the sound source at the target sound direction-of-arrival $\theta_S$, the constraint relating to the spatial structure is defined by $u_S + u_{IN} + u_{BN} = c.$ 5. The PSD optimization device according to claim 1, wherein, with $u = [u_S^T, u_{IN}^T, u_{BN}^T]^T$, and v as an auxiliary variable of variable u, the optimization problem for the cost function is defined as a problem in which $\inf_{u,v} F_1(u) + F_2(v)$ (where $F_1$ and $F_2$ are convex functions) is solved under linear constraints relating to the variables u and v, and where the linear constraints relating to the variables u and v include at least one of a constraint relating to the frequency structure of the sound source, a constraint relating to the temporal structure of the sound source, and a constraint relating to the spatial structure of the sound source, or $F_1(u) + F_2(v)$ includes at least one of a convex cost term relating to the frequency structure of the sound source, a convex cost term relating to the temporal structure of the sound source, and a convex cost term relating to the spatial structure of the sound source.

6. The PSD optimization device according to claim 5, wherein linear constraints regarding the variables u and v are $Au = v, Bu = c, u \geq 0$ where $A = [\Lambda\ 0\ 0]$, $B = [I, I, I]$, c is the PSD estimation value of enhanced signals of the sound source at the target sound direction-of-arrival $\theta_S$, $\Lambda (\in R^{\Omega \times \Omega})$ is a predetermined sparse matrix, $I (\in R^{\Omega \times \Omega})$ is an identity matrix, and $\Omega$ is the number of frequency bands, $F_1(u)$ and $F_2(v)$ are each $$F_1(u) = \frac{1}{2}\|W^{1/2}(u-\hat{\varphi})\|_2^2$$

$$F_2(v) = \mu\|v\|_1 + \frac{\rho}{2}\|v - \hat{v}_{\varphi_S}\|_2^2$$

where $$W^{1/2} = \begin{bmatrix} \sqrt{w_S}I & 0 & 0 \\ 0 & \sqrt{w_{IN}}I & 0 \\ 0 & 0 & \sqrt{w_{BN}}I \end{bmatrix} (w_S, w_{IN}, w_{BN} \in R^+)$$

$$\hat{\varphi} = [\hat{\varphi}_S^T, \hat{\varphi}_{IN}^T, \hat{\varphi}_{BN}^T]^T$$

$$\hat{v}_{\varphi_S} = A\hat{\varphi}$$

and $\mu$, $\rho(\in R^+)$ are weighting coefficients,
wherein functions $D_p^*$, $D_q^*$, and $D_r^*$, and dual variables $\tilde{p}$, $\tilde{q}$, and $\tilde{r}$, regarding dual variables p, q, and r, are each defined in the following Expressions, $$D_p^* = D_p^{-1}, D_q^* = D_q^{-1}, D_r^* = D_r^{-1}$$

$$\tilde{p} = \nabla D_p(p), \tilde{q} = \nabla D_q(q), \tilde{r} = \nabla D_r(r)$$

wherein the PSD updating unit includes
a first variable calculator that calculates $u^{t+1}$, which is a result of updating the variable u for a t+1'th time, by the following Expression, $$u^{t+1} = \arg\min_u \left(F_1(u) + J_{D_p^*}(Au\|\tilde{p}^t) + J_{D_q^*}(Bu\|\tilde{q}^t - c) + J_{D_r^*}(u\|-\tilde{r}^t)\right)$$

a first dual variable calculator that calculates $\tilde{p}^{t+1/2}$, which is an intermediate updating result of the dual variable $\tilde{p}$ for the t+1'th time, by the following Expression, $$\tilde{p}^{t+1/2} = \tilde{p}^t - 2Au^{t+1}$$

a second dual variable calculator that calculates $\tilde{q}^{t+1}$, which is a result of updating the dual variable $\tilde{q}$ for the t+1'th time, by the following Expression, $$\tilde{q}^{t+1} = \tilde{q}^t - 2(Bu^{t+1} - c)$$

a third dual variable calculator that calculates $\tilde{r}^{t+1/2}$, which is an intermediate updating result of the dual variable $\tilde{r}$ for the t+1'th time, by the following Expression, $$\tilde{r}^{t+1/2} = \tilde{r}^t - 2u^{t+1}$$

a second variable calculator that calculates $v^{t+1}$, which is a result of updating the auxiliary variable v for the t+1'th time, by the following Expression, $$v^{t+1} = \arg\min_v \left(F_2(v) + J_{D_p^*}(v\|-\tilde{p}^{t+1/2})\right)$$

a fourth dual variable calculator that calculates $\tilde{p}^{t+1}$, which is a result of updating the dual variable $\tilde{p}$ for the t+1'th time, by the following Expression, and $$\tilde{p}^{t+1} = \tilde{p}^{t+1/2} + 2v^{t+1}$$

a fifth dual variable calculator that sets $\tilde{r} = [\tilde{r}_1^T, \tilde{r}_2^T, \tilde{r}_3^T]^T$, and calculates $\tilde{r}^{t+1}$, which is a result of updating the dual variable $\tilde{r}$ for the t+1'th time, by the following Expression $$\tilde{r}_i^{t+1} = \begin{cases} \tilde{r}_i^{t+1/2}(\text{if } \tilde{r}_i^{t+1/2} \geq 0) \\ -\tilde{r}_i^{t+1/2}(\text{otherwise}) \end{cases} (i = 1, 2, 3).$$

7. A power spectral density (PSD) optimization method including a PSD updating step, in which,
with $u_S$ as a variable representing a target sound PSD, $u_{IN}$ as a variable representing an interference noise PSD, and $u_{BN}$ as a variable representing a background noise PSD,
a PSD optimization device takes a target sound PSD input value $\hat{\varphi}_S$, an interference noise PSD input value $\hat{\varphi}_{IN}$, and a background noise PSD input value $\hat{\varphi}_{BN}$ as input, and generates a target sound PSD output value $\varphi_S$, an interference noise PSD output value $\varphi_{IN}$, and a background noise PSD output value $\varphi_{BN}$, by solving an optimization problem for a cost function relating to the variable $u_S$, the variable $u_{IN}$, and the variable $u_{BN}$,
wherein the optimization problem for the cost function is defined using at least one of
a constraint relating to a frequency structure of a sound source or a convex cost term relating to the frequency structure of the sound source,
a constraint relating to a temporal structure of the sound source or a convex cost term relating to the temporal structure of the sound source, and
a constraint relating to a spatial structure of the sound source or a convex cost term relating to the spatial structure of the sound source.

8. The PSD optimization method according to claim 7, wherein the target sound power spectral density (PSD) input value $\hat{\varphi}_S(\omega, \tau)$, the interference noise PSD input value $\hat{\varphi}_{IN}(\omega, \tau)$, and the background noise PSD input value are obtained based on temporal region observation signals $x_m(t)$ obtained by a microphone element m.

9. The PSD optimization method according to claim 8, wherein the set of operations further comprises:
generating frequency region observation signals $X_m(\omega, \tau)$ by transforming the temporal region observation signals $x_m(t)$ according to frequency region.

10. The PSD optimization method according to claim 9, wherein the set of operations further comprises:
generating enhanced signals $Y_{\theta\_S}(\omega, \tau)$ by performing linear filtering of the frequency region observation signals $X_m(\omega, \tau)$.

11. The PSD optimization method according to claim 9, wherein the set of operations further comprises:
generating enhanced signals $Y_{\theta\_j}$ by performing linear filtering of the frequency region observation signals $X_m(\omega, \tau)$.

12. A non-transitory computer-readable medium having computer-readable instructions stored thereon, which, when executed, cause a computer including a memory and a processor to execute a set of operations, comprising:
obtaining a target sound power spectral density (PSD) input value $\hat{\varphi}_S(\omega, \tau)$, an interference noise PSD input value $\hat{\varphi}_{IN}(\omega, \tau)$, and a background noise PSD input value $\hat{\varphi}_{BN}(\omega, \tau)$ as input, with $u_S$ as a variable representing a target sound PSD, $u_{IN}$ as a variable representing an interference noise PSD, and $u_{BN}$ as a variable representing a background noise PSD, and generating a target sound PSD output value $\varphi_S(\omega, \tau)$, an interference noise PSD output value $\varphi_{IN}(\omega, \tau)$, and a background noise PSD output value $\varphi_{BN}(\omega, \tau)$, by solving an optimization problem for a cost function relating to the variable $u_S$, the variable $u_{IN}$, and the variable $u_{BN}$, wherein the optimization problem for the cost function is defined using at least one of:
  a constraint relating to a frequency structure of a sound source or a convex cost term relating to the frequency structure of the sound source,
  a constraint relating to a temporal structure of the sound source or a convex cost term relating to the temporal structure of the sound source, and
  a constraint relating to a spatial structure of the sound source or a convex cost term relating to the spatial structure of the sound source.

13. The non-transitory computer-readable medium according to claim 12,
wherein a convex cost term L relating to the frequency structure is defined by $$L(u_S) = \mu\|\Lambda u_S\|_1 + \frac{\rho}{2}\|\Lambda u_S - \Lambda\hat{\varphi}_S\|_2^2$$

where $\mu, \rho (\in R^+)$ are weighting coefficients, $\Lambda(\in R^{\Omega\times\Omega})$ is a predetermined sparse matrix, and $\Omega$ is a count of frequency bands.

14. The non-transitory computer-readable medium according to claim 13,
wherein, with $u_{BN,\tau}$ as a variable representing the background noise PSD at a time frame $\tau$, and $\hat{\varphi}_{BN,\tau-1}$ as a background noise PSD estimation value at time frame $\tau-1$,
a convex cost term L relating to the temporal structure is defined by $$L(u_{BN,\tau}) = \frac{\gamma_{BN}}{2}\|\hat{\varphi}_{BN,\tau-1} - u_{BN,\tau}\|_2^2$$

where $\gamma_{BN}(\in R^+)$ is a weighting coefficient.

15. The non-transitory computer-readable medium according to claim 13,
wherein, with c as a PSD estimation value of enhanced signals of the sound source at the target sound direction-of-arrival $\theta_S$,
the constraint relating to the spatial structure is defined by $$u_S + u_{IN} + u_{BN} = c.$$

16. The non-transitory computer-readable medium according to claim 13,
wherein, with $u = [u_S^T, u_{IN}^T, u_{BN}^T]^T$, and v as an auxiliary variable of variable u,
the optimization problem for the cost function is defined as a problem in which $\inf_{u,v} F_1(u) + F_2(v)$ (where $F_1$ and $F_2$ are convex functions) is solved under linear constraints relating to the variables u and v,
and where the linear constraints relating to the variables u and v include at least one of a constraint relating to the frequency structure of the sound source, a constraint relating to the temporal structure of the sound source, and a constraint relating to the spatial structure of the sound source, or $F_1(u)+F_2(v)$ includes at least one of a convex cost term relating to the frequency structure of the sound source, a convex cost term relating to the temporal structure of the sound source, and a convex cost term relating to the spatial structure of the sound source.

17. The non-transitory computer-readable medium according to claim 16,
wherein linear constraints regarding the variables u and v are $$Au=v, Bu=c, v\geq 0$$

where $A=[\Lambda\ 0\ 0]$, $B=[I, I, I]$, c is the PSD estimation value of enhanced signals of the sound source at the target sound direction-of-arrival $\theta_S$, $\Lambda(\in R^{\Omega\times\Omega})$ is a predetermined sparse matrix, $I(\in R^{\Omega\times\Omega})$ is an identity matrix, and $\Omega$ is the number of frequency bands,
$F_1(u)$ and $F_2(v)$ are each $$F_1(u) = \frac{1}{2}\|W^{1/2}(u - \hat{\varphi})\|_2^2$$

$$F_2(v) = \mu\|v\|_1 + \frac{\rho}{2}\|v - \hat{v}_{\varphi_S}\|_2^2$$

where $$W^{1/2} = \begin{bmatrix} \sqrt{w_S}I & 0 & 0 \\ 0 & \sqrt{w_{IN}}I & 0 \\ 0 & 0 & \sqrt{w_{BN}}I \end{bmatrix} (w_S, w_{IN}, w_{BN} \in R^+)$$

$$\hat{\varphi} = [\hat{\varphi}_S^T, \hat{\varphi}_{IN}^T, \hat{\varphi}_{BN}^T]^T$$

$$\hat{v}_{\varphi_S} = A\hat{\varphi}$$

and $\mu, \rho(\in R^+)$ are weighting coefficients,
wherein functions $D_p^*, D_q^*$, and $D_r^*$, and dual variables $\bar{p}, \bar{q}$, and $\bar{r}$, regarding dual variables p, q, and r, are each defined in the following Expressions, $$D_p^* = D_p^{-1}, D_q^* = D_q^{-1}, D_r^* = D_r^{-1}$$

$$\bar{p} = \nabla D_p(p), \bar{q} = \nabla D_q(q), \bar{r} = \nabla D_r(r)$$

wherein the PSD updating unit includes
a first variable calculator that calculates $u^{t+1}$, which is a result of updating the variable u for a t+1'th time, by the following Expression, $$u^{t+1} = \arg\min_u\left(F_1(u) + J_{D_p^*}(Au\|\bar{p}^t) + J_{D_q^*}(Bu\|\bar{q}^t - c) + J_{D_r^*}(u\|-\bar{r}^t)\right)$$

a first dual variable calculator that calculates $\bar{p}^{t+1/2}$, which is an intermediate updating result of the dual variable ~p for the t+1'th time, by the following Expression, $$\bar{p}^{t+1/2} = \bar{p}^t - 2Au^{t+1}$$

a second dual variable calculator that calculates $\sim q^{t+1}$, which is a result of updating the dual variable ~q for the t+1'th time, by the following Expression, $$\bar{q}^{t+1} = \bar{q}^t - 2(Bu^{t+1} - c)$$

a third dual variable calculator that calculates $\sim r^{t+1/2}$, which is an intermediate updating result of the dual variable ~r for the t+1'th time, by the following Expression, $$\bar{r}^{t+1/2} = \bar{r}^t - 2u^{t+1}$$

a second variable calculator that calculates $v^{t+1}$, which is a result of updating the auxiliary variable v for the t+1'th time, by the following Expression, $$v^{t+1} = \arg\min_{v}\left(F_2(v) + J_{D_p^\bullet}\left(v\middle\|-\tilde{p}^{t+1/2}\right)\right)$$

a fourth dual variable calculator that calculates $\sim p^{t+1}$, which is a result of updating the dual variable ~p for the t+1'th time, by the following Expression, and $$\tilde{p}^{t+1} = \tilde{p}^{t+1/2} + 2v^{t+1}$$

a fifth dual variable calculator that sets $\sim r = [\sim r_1^T, \sim r_2^T, \sim r_3^T]^T$, and calculates $\sim r^{t+1}$, which is a result of updating the dual variable ~r for the t+1'th time, by the following Expression $$\tilde{r}_i^{t+1} = \begin{cases} \tilde{r}_i^{t+1/2} & (\text{if } \tilde{r}_i^{t+1/2} \geq 0) \\ -\tilde{r}_i^{t+1/2} & (\text{otherwise}) \end{cases} \quad (i = 1, 2, 3).$$

\* \* \* \* \*